(12) United States Patent
Hwang et al.

(10) Patent No.: US 11,025,367 B2
(45) Date of Patent: Jun. 1, 2021

(54) CHANNEL STATE INFORMATION ESTIMATION WITH CODEWORD INTERFERENCE CANCELLATION

(71) Applicant: Intel IP Corporation, Santa Clara, CA (US)

(72) Inventors: Yeong-Sun Hwang, Oberhaching (DE); Franz Eder, Neubiberg (DE); Matthias Muennich, Taufkirchen (DE); Ziyang Ju, Munich (DE); Carlo Tosetti, Ottobrunn (DE); Anchit Malhotra, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 62 days.

(21) Appl. No.: 15/834,124

(22) Filed: Dec. 7, 2017

(65) Prior Publication Data
US 2019/0181981 A1    Jun. 13, 2019

(51) Int. Cl.
*H04W 72/04*    (2009.01)
*H04L 27/00*    (2006.01)
(Continued)

(52) U.S. Cl.
CPC ......... *H04L 1/0061* (2013.01); *H04B 17/309* (2015.01); *H04L 1/0026* (2013.01);
(Continued)

(58) Field of Classification Search
CPC ..... H04L 1/0026; H04L 5/006; H04L 1/0017; H04B 7/0632; H04B 7/0639; H04B 7/0478; H04B 7/0452
(Continued)

(56) References Cited

U.S. PATENT DOCUMENTS

| | | | |
|---|---|---|---|
| 8,949,683 B1 | 2/2015 | Sun et al. | |
| 2002/0093913 A1* | 7/2002 | Brown | H04L 29/06 370/232 |

(Continued)

OTHER PUBLICATIONS

Kun-Yu Tsai et al.; "Novel Codeword Selection Strategy for MIMO Precoding with Limited Channel State Information feedback"; 2009; pp. 328-331 (4 pages); Department of ECE, Polytechnic Institute of New York University, Brooklyn, NY, 11201 USA.

(Continued)

*Primary Examiner* — Asad M Nawaz
*Assistant Examiner* — Jason A Harley
(74) *Attorney, Agent, or Firm* — Viering, Jentschura & Partner MBB

(57) ABSTRACT

A signal processing device includes a determiner configured to determine if a codeword included in a data signal corresponds to a reference codeword included in a first set of reference codewords or a second set of reference codewords; a first estimator configured to estimate a first channel quality metric value for the data signal based on a first channel quality metric, if the codeword corresponds to a reference codeword included in the first set of reference codewords, wherein the first channel quality value is smaller than a reference channel quality metric value for the data signal, wherein the reference channel quality metric value for the data signal results from a channel quality estimation based on a predetermined channel quality metric; and a second estimator configured to estimate a second channel quality metric value for the data signal based on a second channel quality metric, if the codeword corresponds to a reference codeword included in the second set of reference codewords, wherein the second channel quality value is equal to or larger than the reference channel quality metric value for the data signal.

23 Claims, 14 Drawing Sheets

(51) Int. Cl.
*H04B 17/309* (2015.01)
*H04L 1/20* (2006.01)
*H04L 1/00* (2006.01)
H04B 7/08 (2006.01)
H04B 7/0413 (2017.01)

(52) U.S. Cl.
CPC .............. *H04L 1/0045* (2013.01); *H04L 1/20* (2013.01); *H04B 7/0413* (2013.01); *H04B 7/08* (2013.01); *H04L 1/0003* (2013.01)

(58) Field of Classification Search
USPC ............................................ 370/334; 455/69
See application file for complete search history.

(56) References Cited

U.S. PATENT DOCUMENTS

| | | | | |
|---|---|---|---|---|
| 2004/0043769 | A1* | 3/2004 | Amerga | H04W 36/30 455/437 |
| 2006/0034164 | A1* | 2/2006 | Ozluturk | H04B 7/0697 370/208 |
| 2009/0154588 | A1* | 6/2009 | Chen | H04L 1/0026 375/267 |
| 2010/0070828 | A1* | 3/2010 | Murakami | H04L 1/22 714/762 |
| 2010/0177653 | A1* | 7/2010 | Luo | H04L 1/0026 370/252 |
| 2012/0069833 | A1 | 3/2012 | Molnar | |
| 2013/0324145 | A1* | 12/2013 | Tabet | H04L 1/0027 455/452.2 |
| 2015/0312015 | A1 | 10/2015 | Chen et al. | |
| 2016/0191125 | A1 | 6/2016 | Mundarath et al. | |
| 2016/0359647 | A1 | 12/2016 | Maomao et al. | |

OTHER PUBLICATIONS

International Search Report issued for the international application No. PCT/US2018/059516, dated Feb. 15, 2019, 10 pages (for informational purpose only).

* cited by examiner

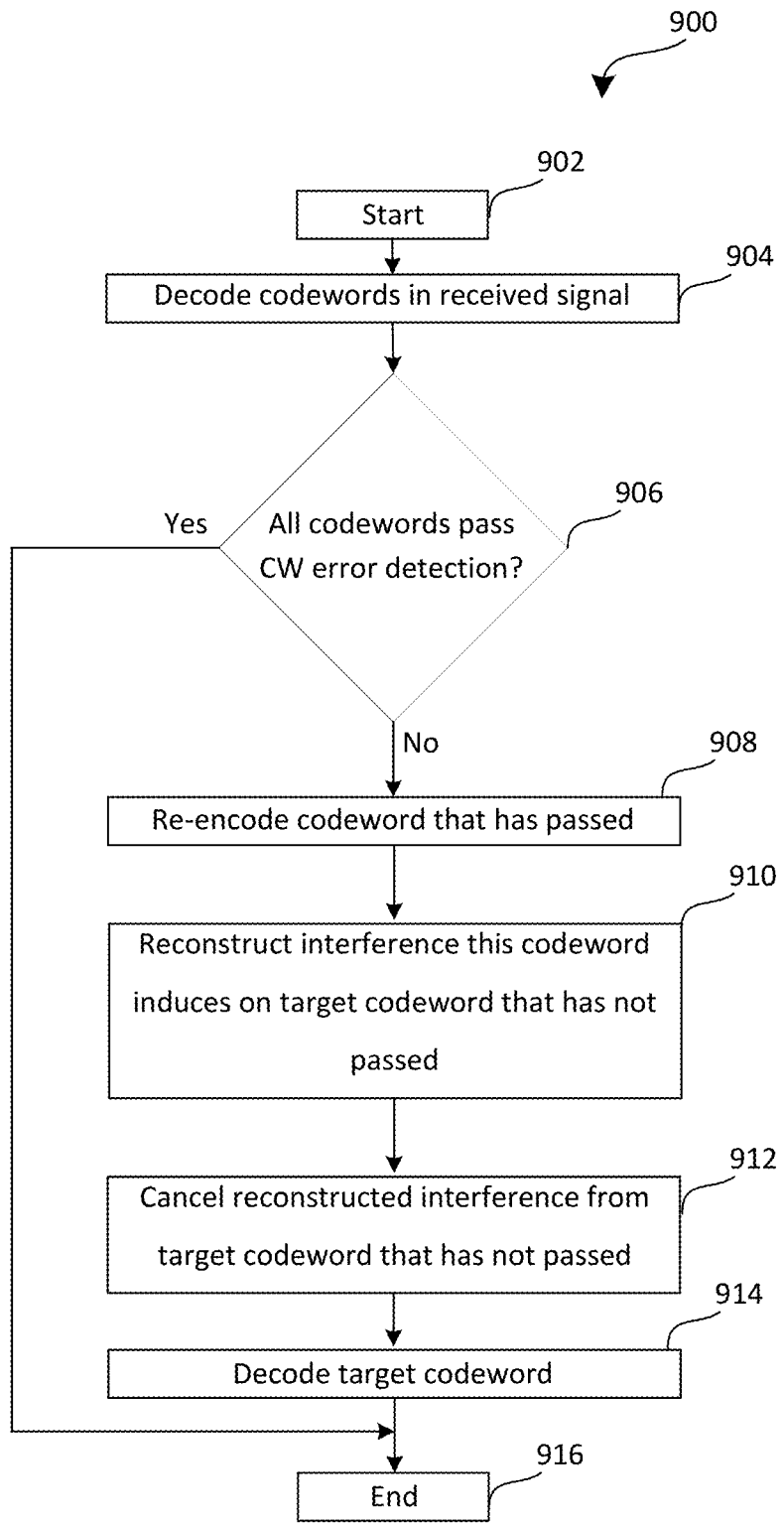

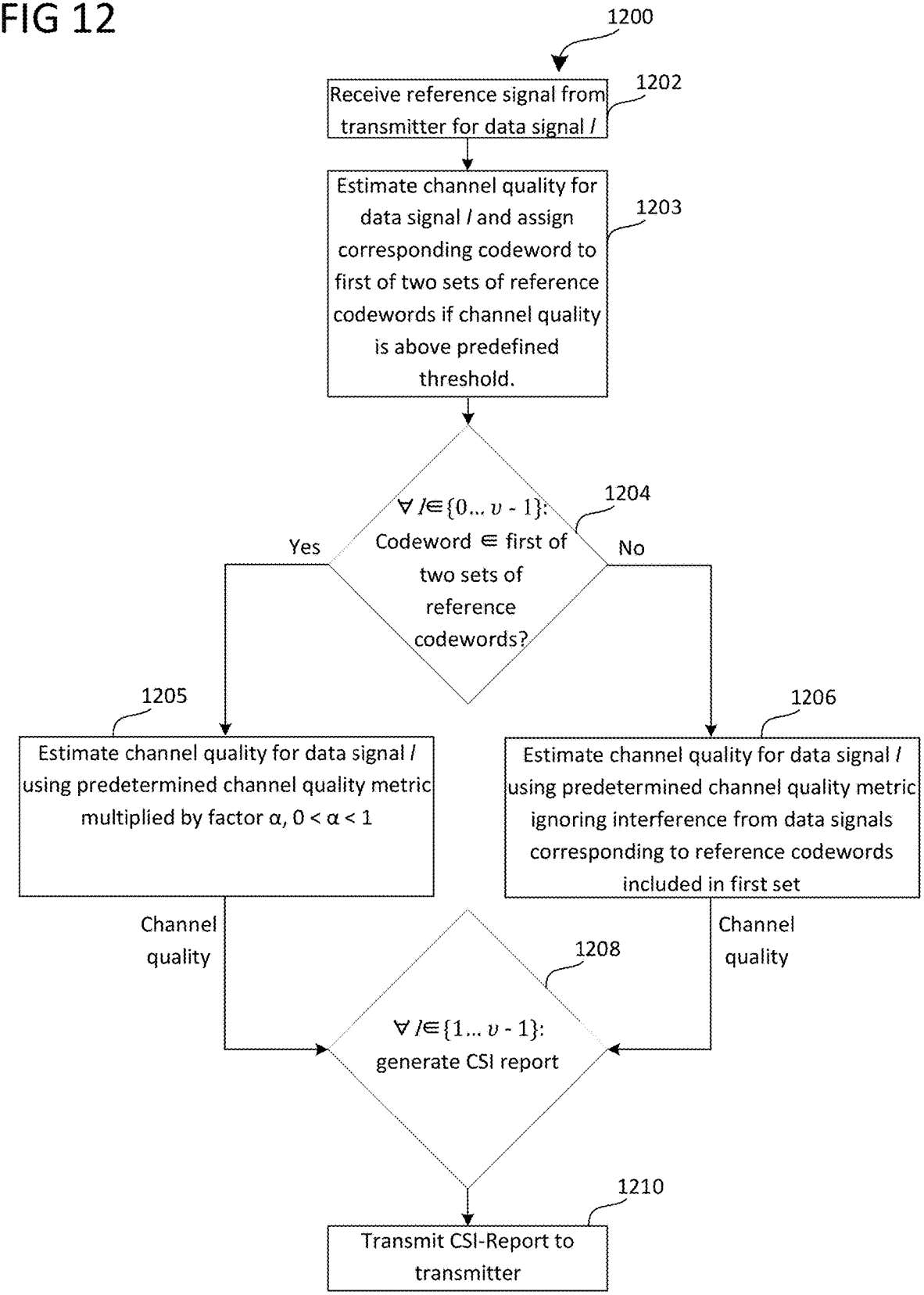

CHANNEL STATE INFORMATION ESTIMATION WITH CODEWORD INTERFERENCE CANCELLATION

TECHNICAL FIELD

Various embodiments relate generally to methods and devices for channel state information estimation.

BACKGROUND

In radio communication, a transmitter and a receiver can communicate more than one data signal simultaneously or concurrently within a transmission period using respective pairs of transmit and receive antenna ports. Each of the data signals communicated in parallel can include a codeword (CW) of error protection encoded data. Multiple codeword multiple-input multiple-output (MIMO) is an example technology, where multiple data signals are separately coded and modulated before being spatially multiplexed to be communicated between transmitter and receiver. In this context, a codeword may be a data block or transport block associated with an independent modulation and coding scheme (MCS). For example, the transmitter may set an MCS for a codeword based on corresponding channel state information (CSI) received from the receiver.

Interference cancellation (IC) may improve performance of radio communication using multiple data signals communicated in parallel by substantially cancelling the interference and/or mitigating the interference. For example, successive interference cancellation decodes and subtracts a stronger data signal out of a combined data signal from the combined signal to extract a weaker signal from the combined data signal. In the case of multiple codeword MIMO, each transmitted codeword can be individually decoded enabling the use of codeword interference cancellation (CW-IC). Codeword interference cancellation reconstructs interference that codewords, which pass a codeword error detection (for example a cyclic redundancy check), may impose on a target codeword that does not pass the codeword error detection, and cancels the reconstructed interference from the received target codeword.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 9 shows an exemplary method which the receiver may execute in accordance with some aspects using the internal configuration shown in FIG. 8;

FIG. 12 illustrates an exemplary method, which the receiver may execute in accordance with some aspects using the internal configuration shown in FIG. 11;

DESCRIPTION

Figure 1:
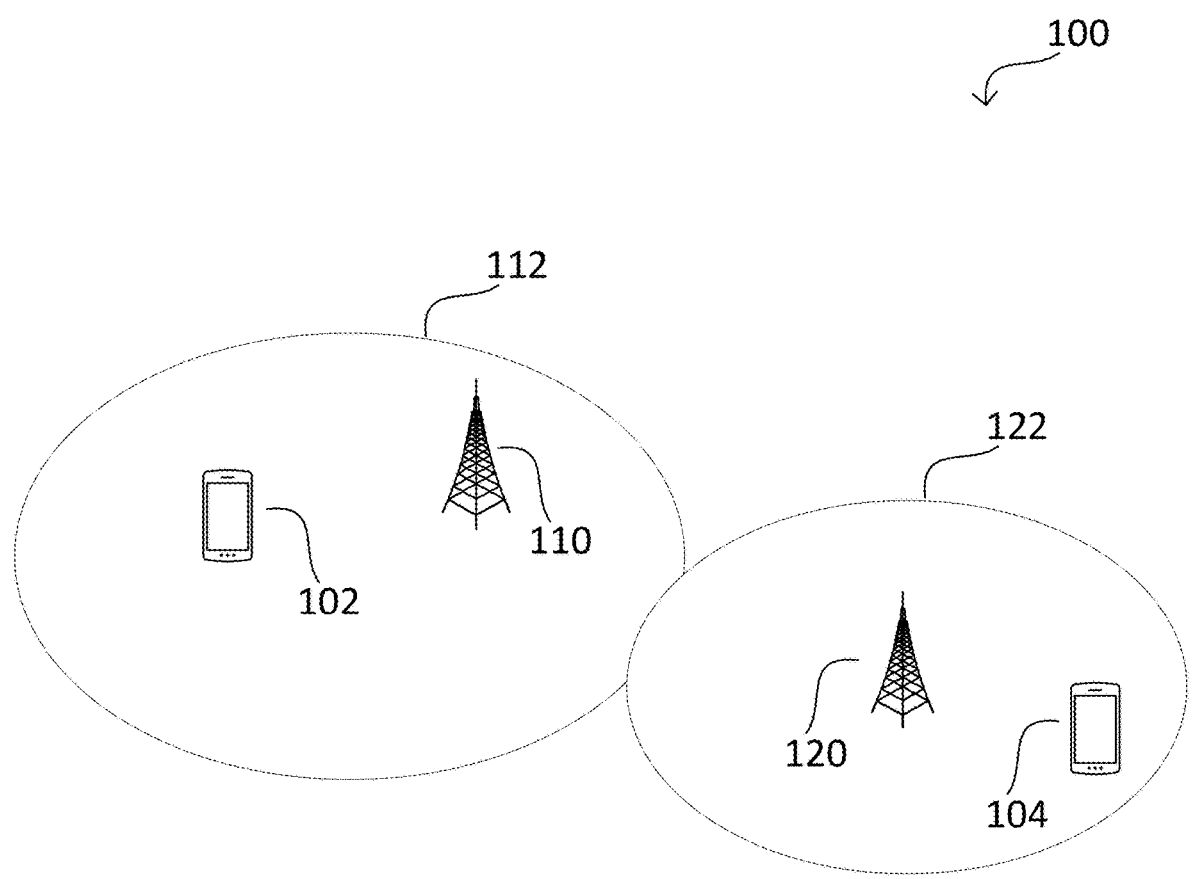
FIG. 1 shows an exemplary communication network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set (of)", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, samples, symbols, elements, etc. Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g.

including a 1×1 matrix (e.g. a scalar), a 1×M matrix (e.g. a row vector), and an M×1 matrix (e.g. a column vector).

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "terminal device" utilized herein refers to user-side devices (both mobile and immobile) that can connect to a core network and various external networks via a radio access network. The term "network access node" as utilized herein refers to a network-side device that provides a radio access network with which terminal devices can connect and exchange information with other networks through the network access node.

The term "base station" used in reference to an access point of a mobile communication network may be understood as a macro base station, micro base station, Node B, evolved NodeB (eNB), Home eNodeB, Remote Radio Head (RRH), relay point, etc. As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc. The terms "user equipment", "UE", "mobile terminal", "user terminal", "terminal device", etc., may apply to any wireless communication device, including cellular phones, tablets, laptops, personal computers, wearables, multimedia playback and other handheld electronic devices, consumer/home/office/commercial appliances, vehicles, and any number of additional electronic devices capable of wireless communications.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

Aspects described herein can be used on various different types of spectrum, including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies include Bluetooth, WLAN (e.g. according to any IEEE 802.11 standard), and other similar radio communication technologies. Cellular Wide Area radio communication technologies include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+), Worldwide Interoperability for Microwave Access (WiMax) (e.g. according to an IEEE 802.16 radio communication standard, e.g. WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies. It is understood that exemplary scenarios detailed herein are demonstrative in nature, and accordingly may be similarly applied to various other mobile communication technologies, both existing and not yet formulated, particularly in cases where such mobile communication technologies share similar features as disclosed regarding the following examples. Furthermore, as used herein the term GSM refers to both circuit- and packet-switched GSM, i.e. including GPRS, EDGE, and any other related GSM technologies. Likewise, the term UMTS refers to both circuit- and packet-switched GSM, i.e. including HSPA, HSDPA/HSUPA, HSDPA+/HSUPA+, and any other related UMTS technologies.

The term "network" as utilized herein, e.g. in reference to a communication network such as a radio communication network, encompasses both an access section of a network (e.g. a radio access network (RAN) section) and a core section of a network (e.g. a core network section). The term "radio idle mode" or "radio idle state" used herein in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the term "transmit" encompasses both direct (point-to-point) and indirect transmission (via one or more intermediary points). Similarly, the term "receive" encompasses both direct and indirect reception. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

FIG. 1 shows communication network 100, which may include terminal devices 102 and 104 in addition to network access nodes 110 and 120. Communication network 100 may communicate via network access nodes 110 and 120 with terminal devices 102 and 104 via various mechanisms. In some aspects, communication network 100 may be an ad-hoc network, which may be self-organizing, i.e., the ad-hoc network may be composed of devices that are not pre-configured to have certain roles. A device may be an apparatus capable of communicating via the communication means of communication network 100. Any device may independently become part of communication network 100, such as via self-configuration and/or registration with other devices. Thus, in some aspects communication network 100 may not have a fixed set of devices. In some aspects, the ad-hoc network may be composed of heterogeneous devices or homogenous devices. Homogeneous devices may all have the same properties, such as computational power, communication rate, communication technologies, etc. Heterogeneous devices on the other hand, may have varying properties. Communications between devices in the ad-hoc network may be able to communicate directly to one another, e.g., peer-to-peer, or may be synchronized to forward communications via other devices to a targeted device, e.g., peer-to-remote.

The ad-hoc network may include a hierarchy or a system in which one or more devices, for example, network access nodes 110 and 120, may direct other devices in communication network 100 to transmit communications. The hierarchy of devices may be based on computational power. For example, devices with a higher computational power than other devices may be assigned a higher hierarchy, and may thus direct the communications of lower hierarchy devices, such as to direct communication forwarding more efficiently.

In some aspects, communication network 100 can use a sound wave access network. Devices, e.g., network access nodes 110 and 120, as well as terminal devices 102 and 104, may utilize transducers, e.g., including a diaphragm, to convert electrical signals into physical sound waves that propagate through a medium, such as air. The sound waves may be in an ultrasonic frequency and may be modulated to convey communications between devices.

In some aspects, communication network 100 can use an optical access network. Devices, such as network access nodes 110 and 120 and/or terminal devices 102 and 104, may utilize electromagnetic radiation in, for example, the visible light spectrum, infrared spectrum, and/or ultraviolet spectrum to convey communications between devices. Communications may be effected between a light source and a light-sensitive sensor.

In some aspects, communication network 100 can use a radio access network, which may herein be referred to as radio communication network 100. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be analogously applied mutatis mutandis to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, e.g. for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

Figure 2:
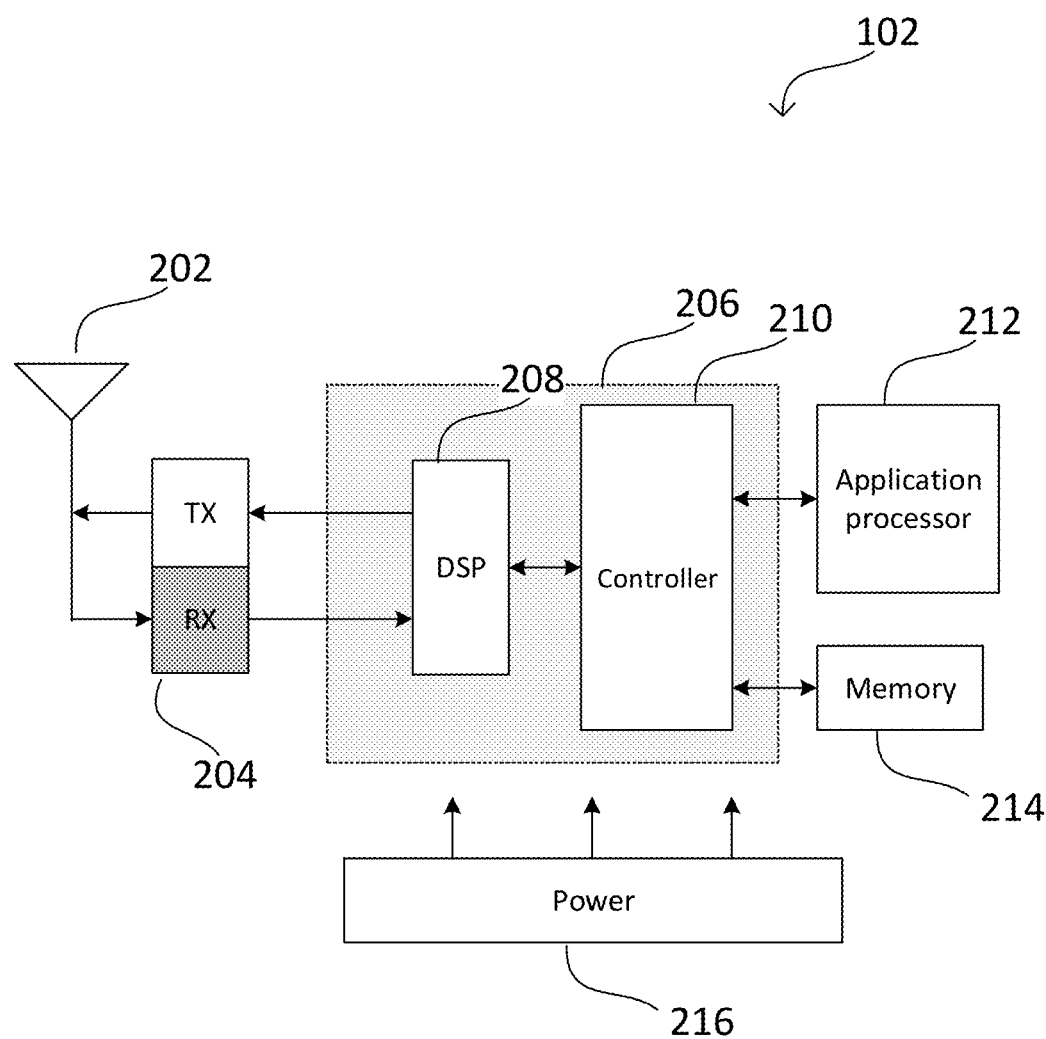
FIG. 2 shows an exemplary internal configuration of a terminal device according to some aspects.

FIG. 2 shows an internal configuration of terminal device 102, which may include antenna system 202, radio frequency (RF) transceiver 204, baseband modem 206 (including digital signal processing subsystem 208 and controller 210), application processor 212, memory 214, and power supply 216. Although not explicitly shown in FIG. 2, terminal device 102 may include one or more additional hardware, software, and/or firmware components (such as processors/microprocessors, controllers/microcontrollers, other specialty or generic hardware/processors/circuits, etc.), peripheral device(s), memory, power supply, external device interface(s), subscriber identity module(s) (SIMs), user input/output devices (display(s), keypad(s), touch-screen(s), speaker(s), external button(s), camera(s), microphone(s), etc.), etc.

In an abridged operational overview, terminal device 102 may transmit and receive radio signals over one or more radio access networks. Baseband modem 206 may direct such communication functionality of terminal device 102 according to the communication protocols associated with each radio access network, and may execute control over antenna system 202 and RF transceiver 204 in order to transmit and receive radio signals according to the formatting and scheduling parameters defined by each communication protocol. Although various actual designs may include separate communication components for different supported radio access technologies (e.g., a separate antenna, RF transceiver, digital signal processing subsystem, and controller), for purposes of conciseness the configuration of terminal device 102 shown in FIG. 2 depicts only a single instance of each such components. Accordingly, in some aspects terminal device 102 may include separate antennas, RF transceivers, digital signal processing subsystem, and and/or controllers for different supported radio access technologies, such as a set of first generation (1G) components, a set of second generation (2G) components, a set of third generation (3G) components, a set of fourth generation (4G) components, a set of fifth generation (5G) components, etc., and/or a set of components for a first short-range radio technology (e.g., WiFi), a set of components for a second short-range radio technology (e.g., Bluetooth), and so forth.

Terminal device 102 may transmit and receive radio signals with antenna system 202, which may include analog antenna combination and/or beamforming circuitry and may be a single antenna or an antenna array that includes multiple antennas. In the receive path (RX), RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may accordingly include analog and digital reception components including amplifiers (e.g., a Low Noise Amplifier (LNA)), filters, RF demodulators (e.g., an RF IQ demodulator)), and analog-to-digital converters (ADCs) to convert the received radio frequency signals to digital baseband samples. In the transmit path (TX), RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., a Power Amplifier (PA), filters, RF modulators (e.g., an RF IQ modulator), and digital-to-analog converters (DACs) to mix the digital baseband samples received from baseband modem 206 to produce the analog radio frequency signals for wireless transmission by antenna system 202. Baseband modem 206 may control the RF transmission and reception of RF transceiver 204, which can include specifying the transmit and receive radio frequencies for operation of RF transceiver 204. In some aspects, radio transceiver 204 may be a software-defined radio (SDR) component implemented as a processor configured to execute software-defined instructions that specify radio frequency processing routines.

As shown in FIG. 2, baseband modem 206 may include digital signal processing subsystem 208, which may perform physical layer (PHY; Layer 1) transmission and reception processing to prepare outgoing transmit data provided by controller 210 for transmission via RF transceiver 204 and prepare incoming received data provided by RF transceiver 204 for processing by controller 210. Digital signal processing subsystem 208 may accordingly perform one or more of error detection (e.g. CRC), forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Digital signal processing subsystem 208 may be structurally realized as hardware (e.g., as one or more digitally-configured hardware circuits, such as ASICs or FPGAs), as software (e.g., one or more processors configured to retrieve and execute program code that defines arithmetic, control, and/or I/O instructions and is stored in a non-transitory computer-readable storage medium), or as a mixed combination of hardware and software. Although not explicitly shown in FIG. 2, digital signal processing subsystem 208 may include a controller configured to control the various hardware and software processing components of digital signal processing subsystem 208 in accordance with physical layer control logic defined by the communications protocol for the relevant radio access technologies. In some aspects, in addition to a controller digital signal processing subsystem 208 may include one or more digitally-configured hardware circuits that are individually configured to perform a particular processing function. The controller may therefore distribute processing tasks to the one or more digitally configured hardware circuits, which may perform their assigned processing function on input data and provide the controller with the resulting output data. Furthermore, while digital signal processing subsystem 208 is depicted as a single component in FIG. 2, digital signal processing subsystem 208 may be collectively implemented as separate sections of physical layer processing components where each respective section is dedicated to, for example, the physical layer processing of a particular radio access technology.

Terminal device 102 may be configured to operate according to one or more radio access technologies, which may be directed by controller 210. Controller 210 may thus be responsible for controlling the radio communication components of terminal device 102 (antenna system 202, RF transceiver 204, and digital signal processing subsystem 208) in accordance with the communication protocols of each supported radio access technology, and accordingly may represent the Access Stratum and Non-Access Stratum (NAS) (also encompassing Layer 2 and Layer 3) of each supported radio access technology. Controller 210 may be structurally embodied as a protocol processor configured to execute protocol software (retrieved from a controller memory) and subsequently control the radio communication components of terminal device 102 in order to transmit and receive communication signals in accordance with the corresponding protocol control logic defined in the protocol software.

Controller 210 may therefore be configured to manage the radio communication functionality of terminal device 102 in order to communicate with the various radio access and core network components of radio communication network 100, and accordingly may be configured according to the communication protocols for multiple radio access technologies. In some aspects, controller 210 may be a unified controller that is collectively responsible for all supported radio access technologies, while in other aspects controller 210 may include multiple separate controllers where each controller is a dedicated controller for a particular radio access technology or group of technologies, such as a dedicated controller for a first radio access technology and a dedicated controller for a second radio access technology. Regardless, controller 210 may be responsible for directing radio communication activity of terminal device 102 according to the communication protocols of the supported radio access technologies. As previously noted regarding digital signal processing subsystem 208, one or both of antenna system 202 and RF transceiver 204 may similarly be partitioned into multiple dedicated component sets that each respectively correspond to one or more of the supported radio access technologies. Depending on the specifics of each such configuration and the number of supported radio access technologies, controller 210 may be configured to control the radio communication operations of terminal device 102 in accordance with, for example, a master/slave RAT hierarchical or multi-SIM scheme.

Terminal device 102 may also include application processor 212, memory 214, and power supply 212. In some aspects, application processor 212 may be a CPU configured to execute various applications and/or programs of terminal device 102 at an application layer of terminal device 102, such as an operating system (OS), a user interface (UI) for supporting user interaction with terminal device 102, and/or various user application programs. The application processor may interface with baseband modem 206 as an application layer to transmit and receive user data such as voice data, audio/video/image data, messaging data, application data, basic Internet/web access data, etc., over the radio network connection(s) provided by baseband modem 206.

Memory 214 may be a memory component of terminal device 102, such as a hard drive or another such permanent memory device. Although not explicitly depicted in FIG. 2, in some aspects the various other components of terminal device 102 shown in FIG. 2 may additionally each include integrated permanent and non-permanent memory components, such as for storing software program code, buffering data, holding current state information, etc.

Power supply 216 may be an electrical power source that provides power to the various electrical components of terminal device 102. Depending on the design of terminal device 102, power supply 216 may be a 'definite' power source such as a battery (rechargeable or disposable) or an 'indefinite' power source such as a wired electrical connection. Operation of the various components of terminal device 102 may thus pull electrical power from power supply 216.

Terminal devices 102 and 102 may execute mobility procedures to connect to, disconnect from, and switch between available network access nodes of the radio access network of radio communication network 100. As individual network access nodes of radio communication network 100 may have a specific coverage area, terminal devices 102 and 102 may be configured to select and re-select between the available network access nodes in order to maintain a suitable radio access connection with the radio access network of radio communication network 100. For example, terminal device 102 may establish a radio access connection with network access node 110 while terminal device 102 may establish a radio access connection with network access node 120. In the event that the current radio access connection degrades, terminal devices 102 or 102 may seek a new radio access connection with another network access node of radio communication network 100. For example, terminal device 102 may move from the coverage area 122 of network access node 120 into the coverage area 112 of network access node 110. As a result, the radio access connection with network access node 120 may degrade, which terminal device 102 may detect via radio measurements (e.g., signal strength or signal quality measurements) of network access node 120. Depending on the mobility procedures defined in the appropriate communication protocols for radio communication network 100, terminal device 102 may seek a new radio access connection (which may be triggered at terminal device 102 or by the radio access network), such as by performing radio measurements on neighboring network access nodes to determine whether any neighboring network access nodes can provide a suitable radio access connection. As terminal device 102 may have moved into the coverage area 112 of network access node 110, terminal device 102 may identify network access node 110 (which may be selected by terminal device 102 or selected by the radio access network) and transfer to a new radio access connection with network access node 110. Such mobility procedures, including radio measurements, cell selection/reselection, and handover are established in the various communication protocols and may be employed by terminal devices and the radio access network in order to maintain strong radio access connections between each terminal device and the radio access network across any number of different radio access network scenarios.

Although reference may be made in the following description to terminal device 102, e.g., that terminal device 102 may receive a transmission, the same may apply to the relevant components of terminal device 104 that may perform the described function, e.g., the receiver may receive the transmission.

Figure 3:
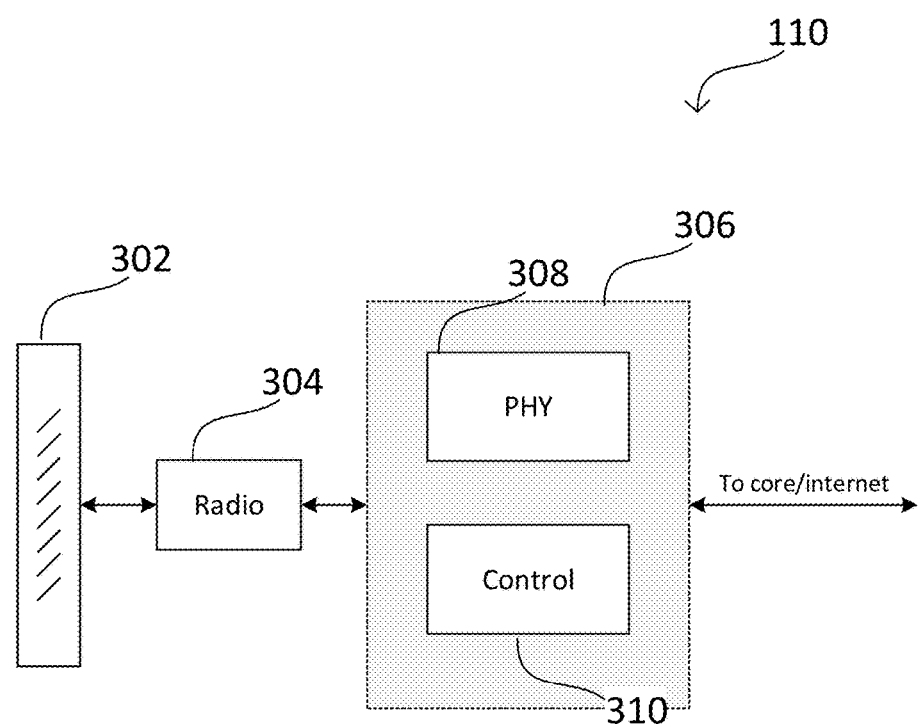
FIG. 3 shows an exemplary internal configuration of a network access node according to some aspects.

FIG. 3 shows an internal configuration of an exemplary network access node such as network access node 110. As shown in FIG. 3, network access node 110 may include antenna system 302, radio transceiver subsystem 304, and communication subsystem 306 (including physical layer subsystem 308 and controller 310). In an abridged overview of the operation of network access node 110, network access node 110 may transmit and receive radio signals via antenna system 302, which may be an antenna array including multiple antennas. Radio transceiver subsystem 304 may perform transmit and receive RF processing to convert outgoing digital data from communication subsystem 306 into analog RF signals to provide to antenna system 302 for radio transmission and to convert incoming analog RF signals received from antenna system 302 into digital data to provide to communication subsystem 306. Physical layer subsystem 308 may be configured to perform transmit and receive PHY processing on digital data received from radio transceiver subsystem 304 to provide to controller 110 and on digital data received from controller 310 to provide to radio transceiver subsystem 304. Controller 310 may control the communication functionality of network access node 110 according to the corresponding communication protocols, e.g., LTE, which may include exercising control over antenna system 302, radio transceiver subsystem 304, and physical layer subsystem 308. Each of radio transceiver subsystem 304, physical layer subsystem 308, and controller 310 may be structurally realized as hardware (e.g., as one or more digitally-configured hardware circuits, such as ASICs or FPGAs), as software (e.g., one or more processors configured to retrieve and execute program code that defines arithmetic, control, and/or I/O instructions and is stored in a non-transitory computer-readable storage medium), or as a mixed combination of hardware and software. In some aspects, radio transceiver subsystem 304 may be a radio transceiver including digital and analog radio frequency processing and amplification circuitry. In some aspects, radio transceiver subsystem 304 may be a software-defined radio (SDR) component implemented as a processor configured to execute software-defined instructions that specify radio frequency processing routines. In some aspects, physical layer subsystem 308 may include a controller and one or more hardware accelerators, wherein the controller is configured to control physical layer processing and offload certain processing tasks to the one or more hardware accelerators. In some aspects, controller 310 may be a controller configured to execute software-defined instructions that specify upper-layer control functions. In some aspects, controller 310 may be limited to radio communication protocol stack layer functions, while in other aspects controller 310 may also be responsible for transport, internet, and application layer functions.

Network access node 110 may thus provide the functionality of network access nodes in radio communication networks by providing a radio access network to enable served terminal devices to access desired communication data. For example, network access node 110 may also interface with a core network, one or more other network access nodes, or various other internet networks and servers via a wired or wireless backhaul interface.

Figure 4:
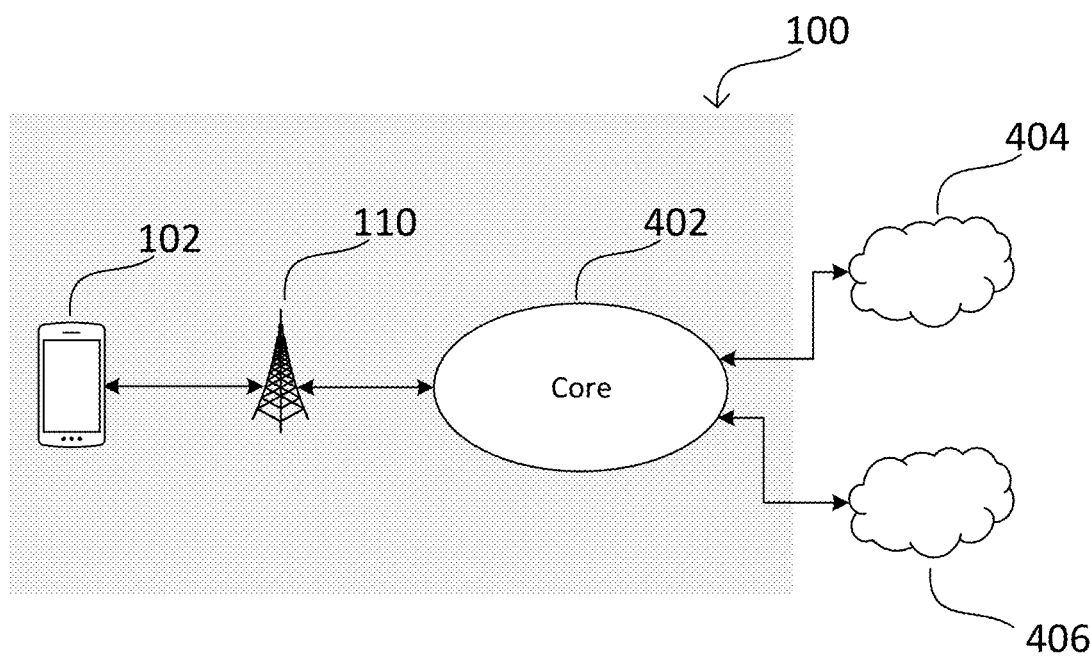
FIG. 4 shows an exemplary communication network interfacing with external data networks according to some aspects.

As previously indicated, network access nodes 110 and 112 may interface with a core network. FIG. 4 shows an exemplary configuration in accordance with some aspects where network access node 110 interfaces with core network 402, which may be a cellular core network. Core network 402 may provide a variety of functions essential to operation of radio communication network 100, such as data routing, authenticating and managing users/subscribers, interfacing with external networks, and various network control tasks. Core network 402 may therefore provide an infrastructure to route data between terminal device 104 and various external networks such as data network 404 and data network 406. Terminal device 104 may thus rely on the radio access network provided by network access node 110 to wirelessly transmit and receive data with network access node 110, which may then provide the data to core network 402 for further routing to external locations such as data networks 404 and 406 (which may be packet data networks (PDNs)). Terminal device 104 may therefore establish a data connection with data network 404 and/or data network 406 that relies on network access node 110 and core network 402 for data transfer and routing.

Radio communications between terminal devices and network access nodes may be executed according to standardized communication protocols that are specific to the utilized radio access technology. As previously described regarding the functionalities of baseband modem 206 of terminal device 102 and communication subsystem 306 of network access node 110, these communication protocols may govern functionalities such as signal formatting, transmission and reception scheduling, spectrum/bandwidth allocation, channel selection, mobility, connection management, and various higher-level control functionalities.

Forward error correction (FEC), also referred to e.g. as channel coding, may be an important component of signal formatting protocols related to the physical (PHY) layer. For example, transmission bits may be encoded including redundant bits using an error-correction code. Using FEC at a transmitter may enable a receiver to detect errors in a transmitted message and correct such errors thereby for example avoiding a need for retransmissions. Examples of FEC codes include block codes and convolutional codes. In particular, turbo codes may be used which may e.g. combine a number of convolutional FEC codes and an interleaver to produce a block code. Given this, user data formatted into an appropriate transport bock and passed to the physical layer can be subjected to FEC coding, e.g. to turbo coding. In certain aspects of the present disclosure, such a transport block provided with error protection can be generally referred to as a codeword. In examples it is possible that a transport block formatted for the physical layer is segmented into code blocks to be individually subjected to channel coding before being reassembled into a single codeword.

In various aspects of the present disclosure, a data signal is an independently transmitted data stream, i.e. a transmission layer. A transmission layer can e.g. be a data stream corresponding to respective logical or virtual antenna ports, where an antenna port may correspond to one or more physical antennas. In these and other various aspects of the present disclosure, a codeword is a data block, e.g. a transport block, that is associated with an independent modulation and coding scheme (MCS). In these aspects, a codeword includes one or more data signals, i.e. transmission layers, i.e. one or more independently transmitted data streams. Thus, in these aspects, each transmission layer or data signal belongs to one and only one codeword as for example in 3GPP LTE or 5G (fifth generation wireless systems) NR (new radio) systems. In these and other various aspects of the present disclosure, a channel quality metric is computed for each transmission layer or data signal, and a transmission layer is associated with one and only one codeword. A codeword comprises one or more layers.

A receiver can be configured to receive a single codeword included in a single data signal via a single antenna port. In various aspects, the receiver is configured to receive a plurality of, for example two or more, codewords in a single transmission interval in parallel, the codewords being associated with two different data signals, e.g. transmission layers. For example, the receiver may receive two codewords including respective data signals, the data signals corresponding to respective antenna ports. Similarly, in a different example, the receiver may receive two codewords in parallel, each codeword including two data signals, each data signal corresponding to a respective antenna port. In a further example, the receiver may receive four codewords in parallel, each codeword including a respective data signal, each data signal corresponding to a respective antenna port. Thereby, the numbers of antenna ports, data signals and codewords are chosen for illustrative purposes only and are not to be considered as limiting. The receiver may be comprised by the terminal device 102 or by the access node 110 described above.

In various aspects, the data signal corresponding to or received via each respective one of at least two antenna ports may correspond to a transmission layer of a multiple-input multiple output (MIMO) communication system. In these aspects, the antenna ports can be logical or virtual antenna ports, each antenna port corresponding to one or more physical antennas of the receiver. Thereby, mapping between logical antenna ports and physical antennas may e.g. be performed using appropriate precoding matrices. Such multiple-input multiple output (MIMO) communication system can be in accordance with any one of the standards mentioned above.

In various aspects, the antenna ports may correspond to physical antennas or antenna systems such as antenna system 202 or antenna system 302 described above. In various aspects, the antenna ports may correspond to logical antenna ports, each logical antenna port corresponding to one or more physical antennas. In various aspects, each antenna port corresponds to one and only one reference codeword. A reference codeword may for example correspond to at least one or a plurality of codewords, e.g. error protected data blocks, transmitted or received in the past or future via at least one corresponding antenna port. In an example where two codewords can be transmitted and received via four antenna ports, two antenna ports can correspond to a first reference codeword and the other two antenna ports can correspond to a second reference codeword.

Physical layer processing may further include an insertion of bits allowing a codeword transmitted at a transmitter to be checked at a receiver (error detection). For example, cyclic redundancy check (CRC) bits may be appended to a transport block, e.g. a 24-bit checksum. Such bits can enable a codeword check, i.e. can enable a receiver to determine whether a codeword transmission was successful or not. A determination that a transmission has not been successful may trigger transmission of a corresponding message from the receiver to the transmitter, e.g. a transmission of a hybrid automatic repeat request (HARQ) message or the like. As mentioned above, in particular in a multiple codeword MIMO scheme, reception quality of a codeword that has not passed a codeword check can be improved by applying codeword interference cancellation.

In various aspects, a component of signal formatting protocols related to the physical (PHY) layer may be modulation and demodulation, where many radio communication protocols may utilize constellation-based modulation schemes such as Quadrature Amplitude Modulation (QAM). In particular, a transmitter may generate a stream of digital data (e.g., a sequence of '1's and '0s') to be transmitted to a counterpart receiver. The transmitter may then partition the stream of digital data into separate blocks, map each block of digital data to one of a plurality of predefined modulation symbols to obtain a modulation symbol, mix the modulation symbol onto an RF carrier, and then wirelessly transmit the resulting RF data to the receiver. Each block of digital data may correspond to a transport block with error protection, i.e. a codeword. Following RF down-conversion, the receiver may perform a demapping operation on the received modulation symbols to recover the original data bits for each modulation symbol, thus obtaining the original stream of digital data.

The number of predefined modulation symbols of the modulation scheme is directly proportional to the supported data rate. For example, higher numbers of modulation symbols (i.e. a higher modulation order) in a given modulation scheme will enable higher numbers of bits to be transmitted with each modulation symbol. In the exemplary case of QAM, N bits can be transmitted with each of $2^N$ total QAM symbols, where e.g. $2^{(N=2)}=4$ modulation symbols represents two bits per symbol, $2^{(N=4)}=16$ represents four bits per symbol, and so forth.

While increasing the number of modulation symbols, or increasing the modulation 'order', can thus increase the data rate by encoding more bits into each symbol, higher order modulation schemes can also be more susceptible to noise and interference. In particular, when plotting modulation symbols as point on the IQ plane, higher numbers of modulation symbols will result in a higher density of points, or in other words, the modulation symbols will be located closer to each other on the IQ plane. On account of this increased density of modulation symbols and resulting reduced distance between the modulation symbols, smaller errors caused by noise and interference can lead to misidentification of received modulation symbols when performing demodulation (e.g., when attempting to determine which predefined modulation symbol each received modulation symbol originally corresponded to).

Radio communications between terminal devices and network access nodes may apply adaptive coding and modulation, which is also referred to as link adaptation. Thereby, in particular modulation and coding schemes (MCS) may be adapted to conditions on the radio link such as pathloss or interference induced on a signal from one transmitter by signals from other transmitters. The MCS may correspond to an index identifying a combination of a number of spatial data streams, a modulation type/order and a code rate. By adapting a modulation and coding scheme to a quality of a radio channel, bit rate and robustness of data transmission can be adapted. For example, by reducing a modulation order of used QAM symbols e.g. from 64QAM (N=6) to 16QAM (N=4) in response to a reduced channel quality, a bit rate is reduced from six bits per symbol to four bits per symbol while robustness of the data transmission is increased. Further, a forward error correction, FEC, code rate can be adapted to a quality of a radio channel. For example, link adaption may increase a rate of transmitted information bits by puncturing, i.e. by reducing a number of redundant bits, in response to an increased radio channel quality. Accordingly, link adaption may increase the number of redundant bits (decrease the rate of information bits) in response to reduced channel quality to increase robustness of the data transmission.

A transmitter may apply link adaptation based on channel state information (CSI) received from a receiver. To this end, a receiver may periodically or aperiodically (e.g. upon request of the transmitter) estimate channel state information. The receiver may estimate the channel quality e.g. based on appropriate sequences known to transmitter and receiver in advance. For example, a sequence known to transmitter and receiver may be transmitted from the transmitter and a channel estimate matrix H can be estimated at the receiver using the combined knowledge of the transmitted and the received signal. Without limitation, such sequences may for example be downlink and uplink reference signals in general, more particularly cell-specific reference signals (CRS), demodulation reference signals (DM-RS), channel state information reference signals (CSI-RS), Multicast-Broadcast single-frequency network (MBSFN), reference signals, uplink demodulation reference signals (CRS) or uplink sounding reference signals (SRS).

Having estimated a channel state, a receiver may transmit a channel state information (CSI) report to the transmitter. CSI reports may for example include a channel quality indication (CQI), representing a highest modulation and coding scheme that, if used, would result in a transmission from the transmitter to the receiver with a block error probability (BLER) not exceeding a predefined value, e.g. of 10%. The BLER may be a ratio of a number of erroneous blocks received to the total number of blocks sent. Thereby, an erroneous block may be a transport block for which its transmission is determined to be unsuccessful. For example, an erroneous block may be a codeword for which a cyclic redundancy check, CRC, results in the codeword to be "not OK". CQI may correspond to an index that identifies corresponding modulation orders and code rates. For example CQI may take a value in between 1 and 15, this range corresponding e.g. to modulation schemes from QPSK to 64QAM. By sending a CSI report including a CQI of 9, a receiver may for example recommend a modulation scheme 16QAM to the transmitter. In other words, channel state information may correspond to a recommendation from the receiver to the transmitter regarding a modulation and coding scheme to be used for a future codeword transmission.

Radio communications between terminal devices and network access nodes may be executed applying multiple-input multiple output (MIMO) schemes in which capacity of a radio link may be increased by using multiple transmit and/or multiple receive antennas at a transmitter or a receiver, respectively. For example, a transmission layer may be mapped to one or more physical transmit antennas where a precoding may be involved in mapping a transmission layer to one or more physical transmit antennas. A physical receive antenna may receive a transmitted signal from all transmit antennas, the transmission layers being resolved by a receiver using precoding matrices and channel estimates. Thus, a data signal, e.g. a transmission layer, may correspond to respective logical antenna ports and may be used for respective data communication. The number of data signals, e.g. transmission layers, may be smaller than a number of physical transmit antennas as a logical antenna port may correspond to one or more physical antennas. In this case, the data signals are communicated between corresponding logical antenna ports, each logical antenna port corresponding to respective physical antennas. Appropriate precoding, using e.g. appropriate precoding matrices, may relate the logical antenna ports to the physical antennas.

As mentioned above, a particular MIMO scheme is a multi codeword MIMO scheme. According to this scheme, multiple codewords are transmitted in parallel during a transmission period, each codeword being included in one or more data signals while each data signal corresponds to a single codeword. Further according to this scheme, each codeword is individually modulated and is thus associated with an independent MCS. In the context of multiple codeword MIMO, a codeword is thus a transport or data block associated with an independent modulation and coding scheme (MCS).

A multi codeword MIMO scheme may employ codeword interference cancellation (CW-IC) in order to improve signal detection e.g. at a receiver. In the multi codeword MIMO scheme, each data signal, e.g. each transmission layer, is associated with a unique codeword, which therefore can be separately decoded. At the receiver, each codeword can be checked, e.g. by applying a cyclic redundancy check (CRC). If a codeword does not pass the codeword error detection, CW-IC reconstructs interference imposed on this target codeword by a codeword that passes the codeword error detection based on the knowledge of the codeword, which passes the codeword error detection. CW-IC then subtracts the reconstructed interference from the target codeword. By thus improving the quality of the target codeword, the likelihood is increased that the target codeword then passes the codeword error detection. In this way, CW-IC may e.g. help to reduce a number of necessary retransmissions.

Various aspects of the present disclosure employ channel quality estimation at a receiver in a way to actively influence MCS selection at a transmitter for respective codewords to be transmitted. The channel quality estimation is employed taking advantage of properties of CW-IC in order to increase an average rate of transmitted information bits.

In particular, the channel quality estimation estimates a first channel quality metric value for a data signal using a first channel quality metric if a codeword is included in a first set of reference codewords. Thereby, the first channel quality value is smaller than a reference channel quality metric value. In other words, the first channel quality metric deliberately underestimates a channel quality. The channel quality estimation further estimates a second channel quality metric value for the data signal using a second channel quality metric, if the codeword corresponds to a reference codeword included in the second set of reference codewords. Thereby, the second channel quality value is equal to or larger than a reference channel quality metric value. In other words, the second channel quality metric deliberately overestimates a channel quality. Thereby, the reference channel quality metric value for the data signal results from a channel quality estimation using a predetermined channel quality metric.

For example, and without limitation, if application of a signal-to-interference-and-noise ratio (SINR) metric (an example of a predetermined channel quality metric) would yield a CQI value of 10, application of the first channel quality metric may yield a CQI value of 9 (or lower) and application of the second channel quality metric may yield a CQI value of 11 (or higher). By reducing a CQI value from 10 to 9, a block error rate which in the case of a CQI value of 10 might have been e.g. 10% may be reduced to e.g. 2% such that a codeword error detection (e.g. CRC) may likely be passed. To the contrary, increasing the CQI value for the codeword corresponding to a reference codeword in the second set of reference codewords e.g. from 10 to 11 will result in the codeword error detection to be likely not passed. The CW-IC is thus made likely to act on the codeword corresponding to a reference codeword included in the second set of reference codewords.

After channel quality estimation, the receiver communicates a corresponding asymmetric CSI report to the transmitter. At least over time, MCS selection at the transmitter will react on the asymmetric CSI report such that codewords corresponding to reference codewords in the first set of reference codewords transmitted from the transmitter to the receiver will have a lower MCS value than the value they would have had if a standard or predetermined channel quality metric (e.g. a SINR metric) were to be applied. The probability that these codewords pass the error detection at the receiver is thus increased such that these codewords can be referred to as robust codewords for convenience. To the contrary, codewords corresponding to codewords included in the second set of reference codewords will have a higher MCS value (than they deserve) and the probability that these codewords pass the error detection is reduced. However, these codewords may be recovered at the receiver employing CW-IC using robust codewords from the first set of reference codewords. The codewords corresponding to reference codewords included in the second set of reference codewords can thus be referred to as interference-cancelled codewords.

Assigning a higher MCS value to codewords corresponding to reference codewords included in the second set of reference codewords, e.g. by using a higher modulation order, increases a rate of transmitted information bits at a cost of a higher error rate. Assigning a lower MCS value to codewords corresponding to reference codewords in the first set of reference codewords, reduces a block error rate of these codewords at a cost of a reduced rate of transmitted information bits. While compensating the effect of a higher error rate for the interference-cancelled codewords by employing CW-IC using the robust codewords, an overall average bit rate can be increased for the overall multiple codeword MIMO system by appropriately designing the first and the second channel quality metrics.

According to various aspects of this disclosure, a receiver employing the above channel quality estimation and CW-IC may be included in a terminal device while a transmitter employing the above MCS selection may be included in a network access node. Alternatively or in addition, in various aspects of this disclosure, a receiver employing the above channel quality estimation and CW-IC may be included in a network access node while a transmitter employing the above MCS selection may be included in a terminal device.

Figure 5:
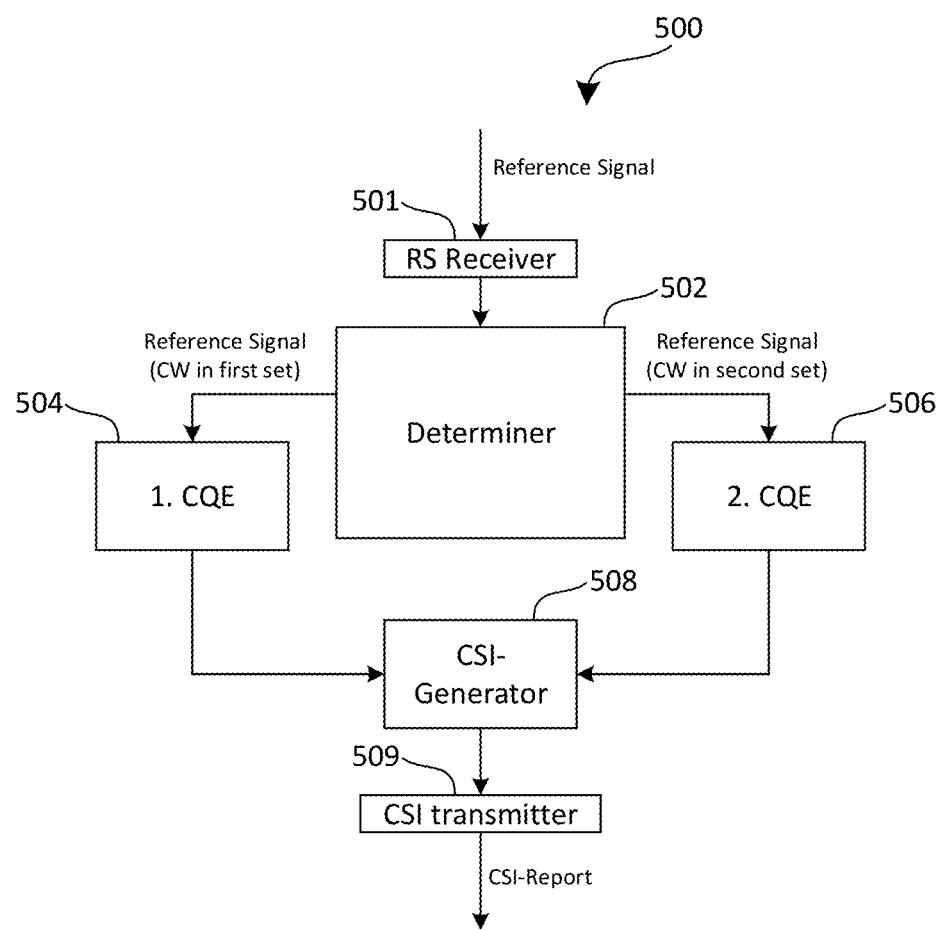
FIG. 5 shows an exemplary internal configuration of a receiver related to channel state information estimation in accordance with various aspects.

FIG. 5 shows an exemplary internal configuration of a receiver 500 related to channel quality estimation in accordance with various aspects of the present disclosure. The receiver 500 of FIG. 5 may be incorporated in or may be part of the baseband modem 206 of the terminal device 102 shown in FIG. 2. Alternatively or in addition, the receiver 500 of FIG. 5 may be incorporated in or be part of communication subsystem 306 of access node 110 as shown in FIG. 3. As the illustrated depiction of FIG. 5 is focused on channel quality estimation, for purposes of conciseness, FIG. 5 may not expressly show certain other components of terminal device 102 or access node 110. As shown in FIG. 5, in some aspects the receiver 500 may include reference signal (RS) receiver 501, determiner 502, first channel quality estimator (CQE) 504, second channel quality estimator (CQE) 506, a channel state information (CSI) generator 508, and a channel state information (CSI) transmitter 509. Each of reference signal (RS) receiver 501, determiner 502, first channel quality estimator 504, second channel quality estimator 506, channel state information (CSI) generator 508, and channel state information (CSI) transmitter 509 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While reference signal (RS) receiver 501, determiner 502, first channel quality estimator 504, second channel quality estimator 506, channel state information (CSI) generator 508, and channel state information (CSI) transmitter 509 are shown separately in FIG. 5, this depiction generally serves to highlight the operation of baseband modem 206 or communication subsystem 306 on a functional level. Reference signal (RS) receiver 501, determiner 502, first channel quality estimator 504, second channel quality estimator 506, channel state information (CSI) generator 508, and channel state information (CSI) transmitter 509 can therefore each be implemented as separate hardware and/or software components, or one or more of reference signal (RS) receiver 501, determiner 502, first channel quality estimator 504, second channel quality estimator 506, channel state information (CSI) generator 508, and channel state information (CSI) transmitter 509 can be combined into a unified hardware and/or software component (for example, a hardware-defined circuitry arrangement including circuitry to perform multiple functions, or a processor configured to execute program code that defines instructions for multiple functions).

As will be described, in some aspects, receiver 500 may be configured to perform a channel quality estimation process for a data signal which includes a codeword. Using as an example a MIMO transmission where a data signal for example corresponding to or received via one of four logical antenna ports (the number of logical antenna ports being equal to or smaller than the number of physical antennas) corresponds to a MIMO transmission layer, a reference codeword CW0 may correspond to two MIMO transmission layers 3 and 4 and reference codeword CW1 may correspond to two MIMO transmission layers 1 and 2. In this way, CW0 includes transmission layer 4, which in turn belongs to the one and only one reference codeword CW0. A reference signal for transmission layer 4 may be sent from a transmitter to the receiver 500, and the receiver 500 may perform channel quality estimation for said transmission layer 4 using a channel quality metric $\gamma_4$ for this transmission layer. Following a different approach, for example, a per-layer SINR (an example of a predetermined channel quality metric for transmission layer 4) may be applied as channel quality metric for transmission layer 4. In accordance with aspects of the present disclosure, a first or a second channel quality metric is applied to transmission layer 4 depending on whether CW0 is included in a first or a second set of reference codewords. A resulting first or second channel quality metric value is thus respectively smaller or at minimum equal to a channel quality metric value estimated using a per-layer SINR (an example of a predetermined channel quality metric) for transmission layer 4. Corresponding channel quality metrics $\gamma_3$, $\gamma_2$, $\gamma_1$ may be defined for transmission layers 3, 2, 1, respectively. In this way, receiver 500 may perform channel quality estimation for the transmission layers 3, 2, 1 using channel quality metrics $\gamma_3$, $\gamma_2$, $\gamma_1$.

Figure 6:
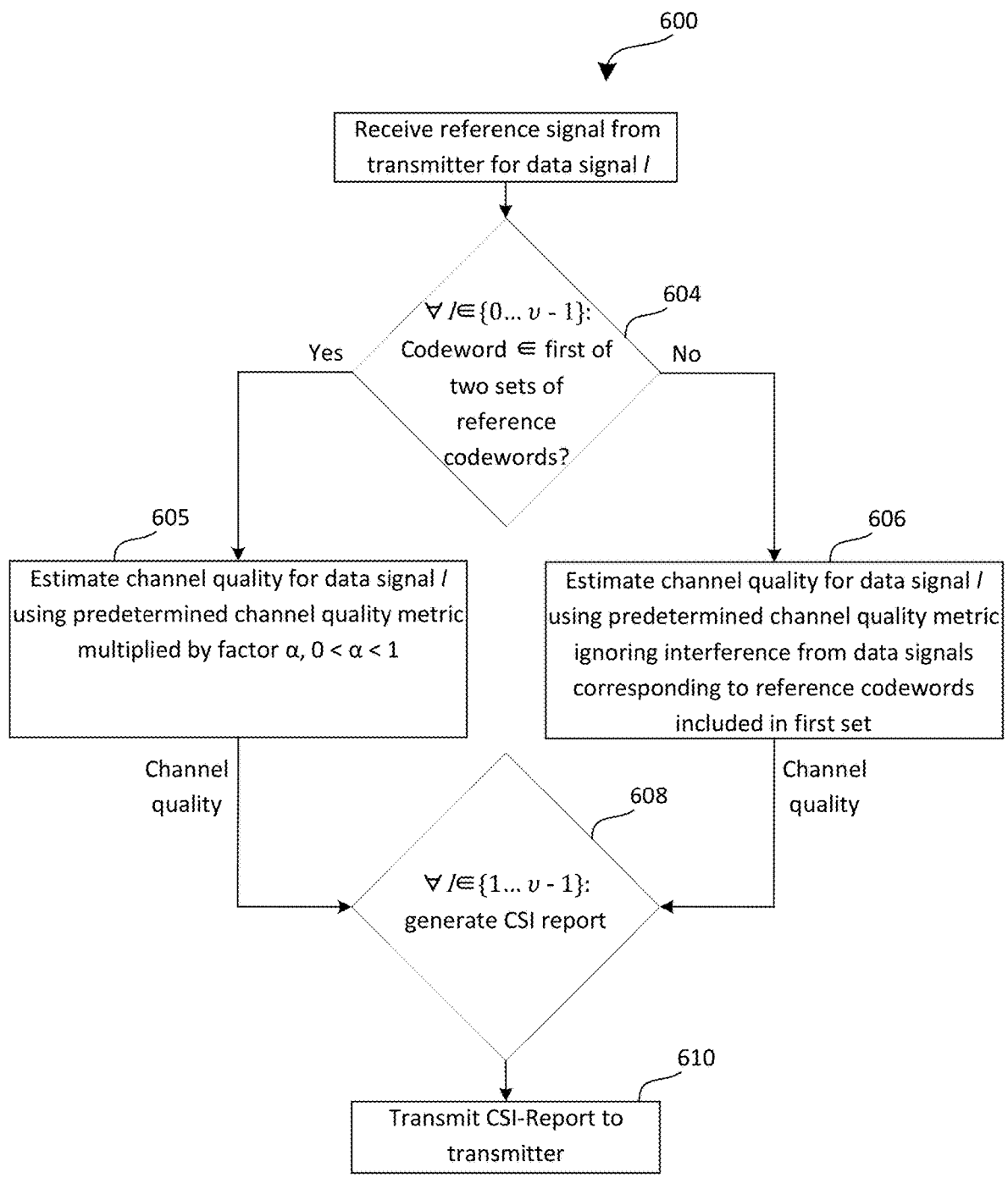
FIG. 6 shows an exemplary method, which the receiver may execute in accordance with some aspects using the internal configuration shown in FIG. 5.

FIG. 6 shows exemplary method 600, which receiver 500 may execute using the internal configuration shown in FIG. 5. In particular, RS receiver 501 may first in stage 602 receive a reference signal transmitted from the transmitter to the receiver for an l-th data signal (e.g. out of v data signals corresponding to v logical antenna ports) and pass the reference signal to the determiner 502. A reference signal may be a signal known in advance to receiver and transmitter such that the receiver may use the reference signal for channel quality estimation using the combined knowledge of transmitted and received signal.

The reference signal may be passed from the RS receiver 501 to the determiner 502, which may determine if the data signal, e.g. transmission layer, for which the channel quality estimation process is to be carried out corresponds to a reference codeword included in a first set or a second set of reference codewords. The determiner may perform the determination e.g. by referring to a pre-stored relation between data signals received via respective antenna ports and codewords. For example, a mapping relation such as the one described above between CW0 and MIMO transmission layers 3 and 4 may be known to the receiver 500 in advance. The determiner may in certain aspects refer to identification information identifying a received codeword, e.g. identification information identifying the data signal to be received via the respective antenna port. In the above example, such identification information may e.g. identify a data signal to be received via antenna port 4 such that the determiner may determine the data signal as corresponding to reference codeword CW0. In certain aspects, such identification may be an index value identifying a port number of a physical or logical antenna port. As will be described in more detail below, the first and second sets of codewords may be statically predefined for every channel quality estimation process in a number of channel quality estimation processes. Alternatively, codewords may be dynamically assigned to the first set of reference codewords or the second set of reference codewords. In various aspects of this disclosure, the first set of reference codewords and the second set of reference codewords are mutually exclusive and each reference codeword is included only in the first or the second set of reference codewords.

If the determiner 502 determines in stage 604 a received codeword as corresponding to a reference codeword included in the first set of reference codewords, the reference signal is passed to the first channel quality estimator 504, which estimates in stage 605 a channel state for the l-th data signal using the first channel quality metric. Application of the first channel quality metric results in a channel quality metric value lower than a channel quality metric value resulting from an application of a predetermined channel quality metric. In other words, if for example a channel quality estimation process using SINR as predetermined channel quality metric would result in a certain channel quality value (e.g. in a CQI value of 10), application of the first channel quality metric may result in a lower value (e.g. in a CQI value of 9 or lower). In various aspects, application of the first channel quality metric may result in a lower channel quality value on average within a predetermined time period or within a predetermined number of channel quality estimation processes.

In various aspects of the present disclosure, the first channel quality metric may correspond to the predetermined channel quality metric multiplied by a damping factor α, whereby 0<α<1. In particular in certain aspects, with the predetermined channel quality metric being $\gamma_l$ for an l-th data signal received via an l-th antenna port, the first channel quality metric $\tilde{\gamma}_{1,l}$ may be expressed as $$\tilde{\gamma}_{1,l} = \alpha \cdot \gamma_l, l \in L_1.$$

Thereby, $L_1$ denotes the group of data signals including a codeword corresponding to a reference codeword included in the first set of reference codewords. In various aspects, the predetermined channel quality metric $\gamma_l$ may be a per-layer minimum mean square error (MMSE) SINR.

In various aspects, the damping factor α can be heuristically determined such that a suitable reduction of the channel quality metric value is achieved. For example, the damping factor α can take a value lower than but close to 1. In certain aspects, the damping factor α can be a value 0.5<α<1. In certain aspects, the damping factor α can be a value 0.75<α<1. In certain aspects, the damping factor α can be a value 0.9<α<1.

If the determiner 502 determines the codeword to correspond to a reference codeword included in the second set of reference codewords in stage 604 the reference signal is passed to the second channel quality estimator 506, which estimates in stage 606 a channel state for the l-th data signal using the second channel quality metric. Application of the second channel quality metric results in a channel quality metric value equal to or higher than a channel quality metric value resulting from an application of the predetermined channel quality metric. In other words, if for example a channel quality estimation process using SINR would result in a certain channel quality value (e.g. in a CQI value of 10), the second channel quality metric is designed such that the channel quality estimation process may result in a higher value (e.g. in a CQI value of 11 or higher).

In various aspects of the present disclosure, the second channel quality metric may correspond to the predetermined channel quality metric for the l-th data signal ignoring interference from data signals, which include codewords corresponding to reference codewords included in the first set of reference codewords. By defining the second quality metric in this way reducing effects of interference on data signals including codewords corresponding to reference codewords included in the second set of reference codewords, a channel state value estimated using this metric may be overestimated.

In various aspects, the predetermined channel quality metric $\gamma_l$ may be a per transmission layer minimum mean square error (MMSE) SINR, expressed as $$\gamma_l = \frac{1}{[(H^H H + I)^{-1}]_{l,l}} - 1, l \in \{0, \ldots, v-1\}.$$

Thereby, H is a channel estimate matrix in a v-transmission layer transmission, i.e. a MIMO transmission with v transmission layers. The notation $(\bullet)^H$ denotes a conjugate transpose (Hermitian) operation, I corresponds to a v×v identity matrix, and [ . . . ]$_{l,l}$ denotes the l-th diagonal element of matrix [ . . . ].

Given this, the second channel quality metric $\tilde{\gamma}_{2,l}$ for an l-th data signal received via an l-th antenna port is in various aspects expressed as $$\tilde{\gamma}_{2,l} = \beta \cdot \gamma(l|c \in C_2), \text{ wherein}$$

$$\gamma(l \mid c \in C_2) = \frac{1}{\left[\left(\hat{H}^H \hat{H} + I\right)^{-1}\right]_{l,l}} - 1, l \in \{0, \ldots, L_2\},$$

wherein $\hat{H}$ is a sub-matrix of a channel estimate matrix H, H having v columns, v being the number of data signals received via each of the at least two antenna ports, wherein $\hat{H}$ is formed by rows and columns of H corresponding to a number ($L_2$) of data signals corresponding to reference codewords included only in the second set ($C_2$) of reference codewords, the notation $(\bullet)^H$ denotes a conjugate transpose operation, I is the identity matrix of the same dimension as $\hat{H}$, and [ . . . ]$_{l,l}$ denotes the l-th diagonal element of matrix [ . . . ] and β is a further damping factor, 0<β≤1.

Thus ignoring effects of interference from layers corresponding to codewords included in the first set of reference codewords, the second channel quality metric may overestimate channel states. For example, instead of estimating a CQI value of 10 estimated with a predetermined channel quality metric, application of the second channel quality metric may thus result in a CQI value of 11 or higher.

In the above aspect, the parameter β is a further damping factor 0<β<1. The further damping factor β can be heuristically determined in order to compensate the overestimating effect of the second channel quality metric. For example, the damping factor β can take a value lower than but close to 1. In certain aspects, the damping factor β can be a value 0.5<β<1. In certain aspects, the damping factor β can be a value 0.75<β<1. In certain aspects, the damping factor β can be a value 0.9<β<1.

Using at least one of the damping factors α and β, a channel quality estimation process applying the first and second channel quality metrics can be suitably adjusted. On average (e.g. over multiple channel quality estimation and codeword reception cycles), a higher data rate can thus be achieved as compared to channel quality estimation using a uniform predetermined channel quality metric that aims at an accurate reflection of the channel quality for each data stream or transmission layer. The damping factor α may be adjusted to suitably improve the quality of the robust codewords corresponding to reference codewords in the first set of reference codewords while ensuring a still acceptable data rate transmitted with these codewords. The damping factor β may be adjusted to drive the MCS selection to higher MCS values thus increasing the data rate while keeping an error rate within a limit that is still compensable by CW-IC at the receiver using the robust codewords. It may thus become possible in various aspects that a throughput loss due to the robust codewords is more than offset by the throughput gain due to the interference-cancelled codewords.

Referring back to FIGS. 5 and 6, in certain aspects, estimated channel state information may be passed from the first channel quality estimator 504 and the second channel quality estimator 506 to the CSI generator 508 until a channel state is estimated for all data signals received for the transmission layers of interest. The CSI generator 508 may generate in stage 608 a channel state information (CSI) report including for example CQI values estimated for each data signal or each transmission layer of a multi codeword MIMO system. In various aspects, the CSI report may include further information such as a rank indication (RI) providing a recommendation on a transmission rank to use, i.e. for example a number of transmission layers that should preferably be used for a subsequent transmission to the receiver. Further, the CSI report may include a precoding matrix indication (PMI) indicating a preferred precoding matrix to use in a subsequent transmission to the receiver. The channel quality indication (CQI) may in these aspects represent a highest modulation-and-coding scheme (MCS) that, if used, would result in a transmission to the receiver using the recommended RI and PMI to be received with a block error rate (BLER) of e.g. at most 10%. In stage 610 the CSI generator 508 may transmit the CSI-report to the transmitter.

FIG. 7 shows an exemplary internal configuration of a transmitter 700 related to MCS selection in accordance with various aspects of the present disclosure. The transmitter 700 of FIG. 7 may be incorporated in or may be part of communication subsystem 306 of access node 110 as shown in FIG. 3. Alternatively or in addition, the transmitter 700 of FIG. 7 may be incorporated in or may be part of the baseband modem 206 of the terminal device 102 shown in FIG. 2. For purposes of conciseness, FIG. 7 may not expressly show certain other components of terminal device 102 or access node 110. As shown in FIG. 7, in some aspects the transmitter 700 may include an encoder & modulator 702, encoders 705 (an encoder at least for each codeword, the number of codewords in the figure being $\lambda$), modulators 706 (a modulator at least for each codeword), a layer mapper 708 and an antenna mapper 710. Each of encoder & modulator 702, encoders 705, modulators 706, layer mapper 708 and antenna mapper 710 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While encoder & modulator 702, encoders 705, modulators 706, layer mapper 708 and antenna mapper 710 are shown separately in FIG. 7, this depiction generally serves to highlight the operation of baseband modem 206 or communication subsystem 306 on a functional level. Encoder & modulator 702, encoders 705, modulators 706, layer mapper 708 and antenna mapper 710 can therefore each be implemented as separate hardware and/or software components, or one or more of encoder & modulator 702, encoders 705, modulators 706, layer mapper 708 and antenna mapper 710 can be combined into a unified hardware and/or software component (for example, a hardware-defined circuitry arrangement including circuitry to perform multiple functions, or a processor configured to execute program code that defines instructions for multiple functions).

As exemplarily illustrated, the encoder & modulator 702 may receive information bits, i.e. data blocks or transport blocks, on the physical layer e.g. from a medium access MAC layer. The encoder & modulator may apply e.g. forward error correction (FEC) encoding to received data blocks thus converting the data into transport blocks with error protection, i.e. codewords. The encoder & modulator may further convert the bit sequences into corresponding modulation symbols (suing e.g. QPSK, 16 QAM or 64 QAM). The encoder & modulator 702 may encode and modulate the received information bits taking into account channel state information received e.g. in the form of a CSI report from receiver 500. For example, taking into account a CQI value recommended by the receiver 500, the encoder & modulator 702 may select an appropriate code rate and/or an appropriate modulation order to be applied for modulating and encoding the information bits. As illustrated in FIG. 7B, the encoder & modulator 702 may include a number of $\lambda$, encoders and a number of $\lambda$ modulators to apply encoding and modulation at least for each of $\lambda$, codewords.

Figure 7A:
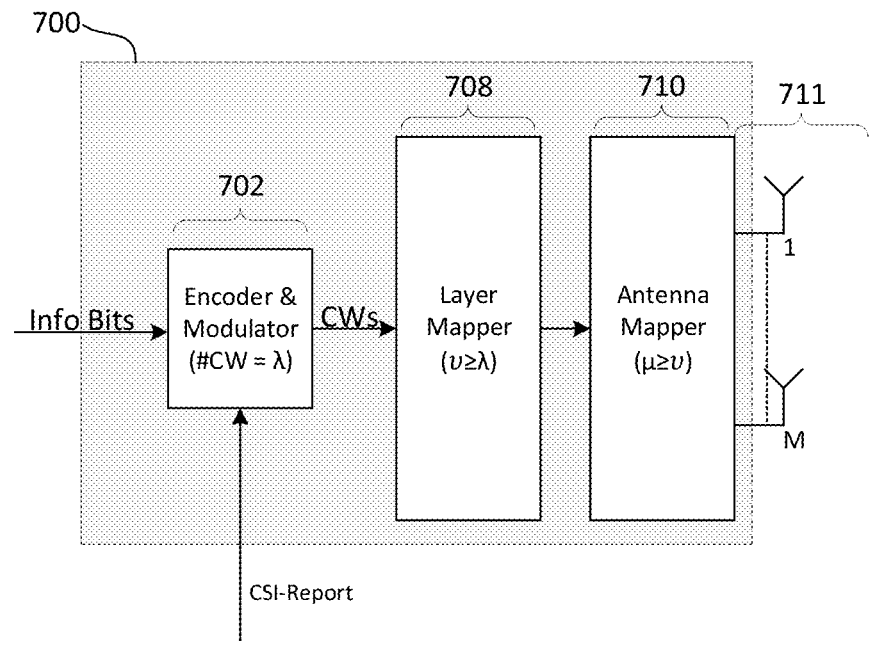
FIG. 7A shows an exemplary internal configuration of a transmitter related to MCS selection in accordance with various aspects.
Figure 7B:
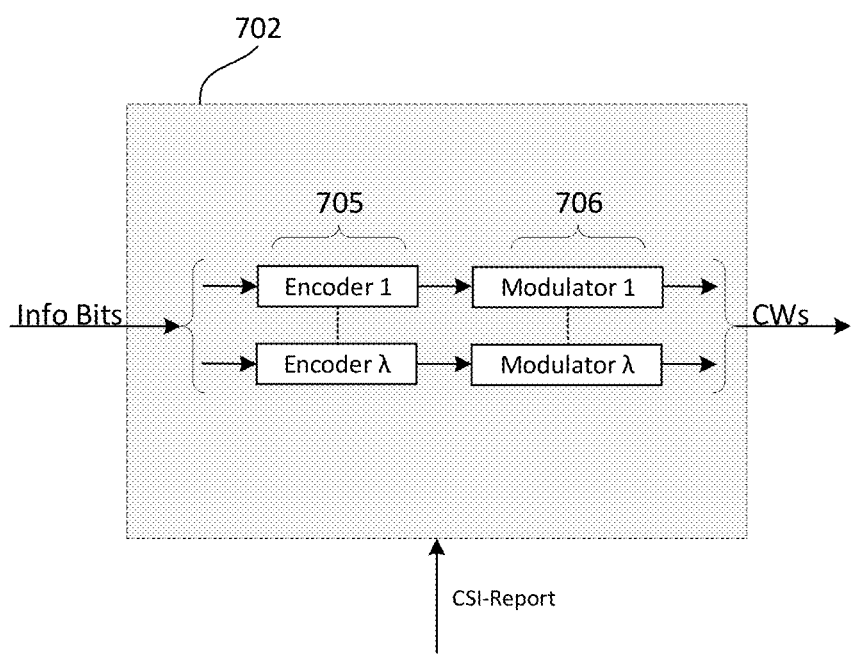
FIG. 7B shows an exemplary internal configuration of a transmitter related to MCS selection in accordance with various aspects.

As further illustrated in FIG. 7A, using the layer mapper 708, the $\lambda$, modulated codewords can be mapped to a number of vdata signals corresponding to a number of v physical or logical antenna ports. e.g. at the receiver and the transmitter. Using the antenna mapper, the v logical antenna ports may be mapped further to a number of M physical antennas 711 which may correspond to antenna system 202 of the terminal device 102 or the antenna system 302 of the access node 110. In general, the number of codewords may be less or equal to the number of data signals, e.g. MIMO transmission layers, while the number of data signals may be less or equal than the number of physical antennas. The layer mapper 708 may apply suitable precoding factors to modulation symbols received from encoder & modulator 702 and may map the precoded symbols to appropriate physical antennas.

Figure 8:
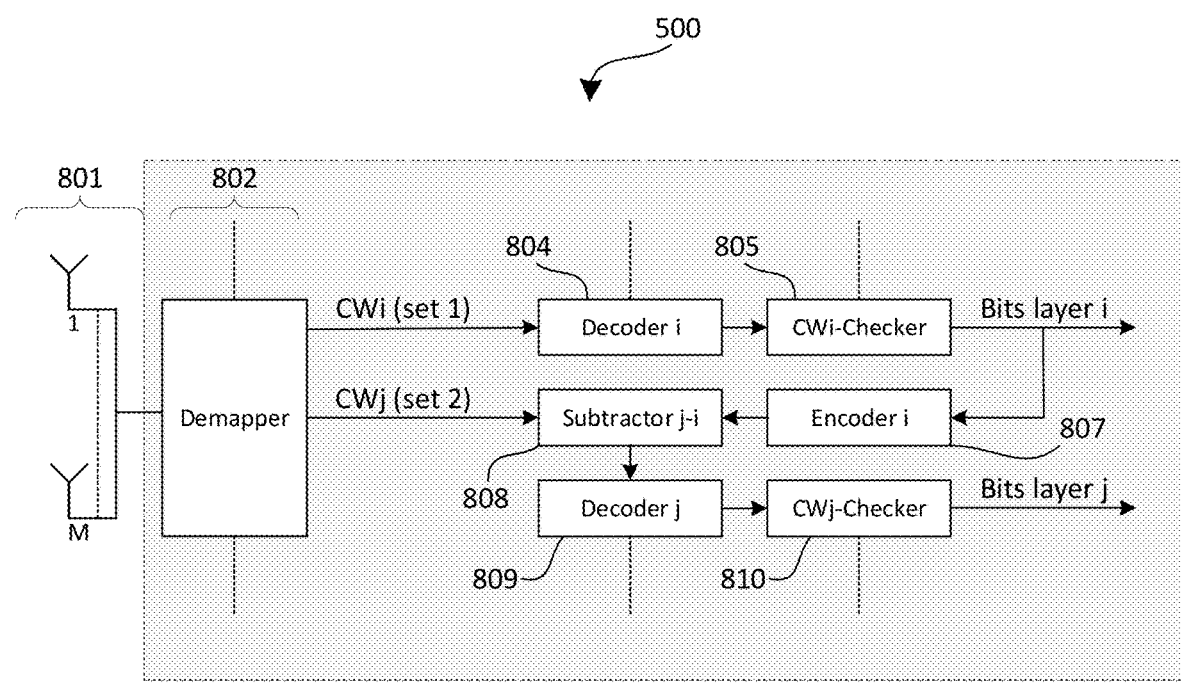
FIG. 8 shows an exemplary internal configuration of the receiver which relates to codeword interference cancellation (CW-IC) in accordance with various aspects.

FIG. 8 shows a further exemplary internal configuration of the receiver 500 which relates to codeword interference cancellation (CW-IC) in accordance with various aspects of the present disclosure. The internal configuration of receiver 500 of FIG. 8 may be incorporated in addition to the internal configuration of receiver 500 of FIG. 5 in the baseband modem 206 of the terminal device 102 shown in FIG. 2 and/or the communication subsystem 306 of access node 110 as shown in FIG. 3. As the illustrated depiction of FIG. 8 is focused on CW-IC, for purposes of conciseness, FIG. 8 may not expressly show certain other components of terminal device 102 or access node 110. As shown in FIG. 8, in some aspects the receiver 500 may further include physical antennas 801, demapper 802, decoder i 804, CWi checker 805, encoder i 807, subtractor i-j 808, decoder j 809 and CWj checker 810. Each of demapper 802, decoder i 804, CWi checker 805, encoder i 807, subtractor i-j 808, decoder j 809 and CWj checker 810 may be structurally realized as hardware (e.g., as one or more digitally-configured hardware circuits, such as ASICs, FPGAs, or another type of dedicated hardware circuit), as software (e.g., one or more processors configured to retrieve and execute program code that defines arithmetic, control, and/or I/O instructions and is stored in a non-transitory computer-readable storage medium), or as a mixed combination of hardware and software. While demapper 802, decoder i 804, CWi checker 805, encoder i 807, subtractor i-j 808, decoder j 809 and CWj checker 810 are shown separately in FIG. 8, this depiction generally serves to highlight the operation of baseband modem 206 or communication subsystem 306 on a functional level. Demapper 802, decoder i 804, CWi checker 805, encoder i 807, subtractor i-j 808, decoder j 809 and CWj checker 810 can therefore each be implemented as separate hardware and/or software components, or one or more of demapper 802, decoder i 804, CWi checker 805, encoder i 807, subtractor i-j 808, decoder j 809 and CWj checker 810 can be combined into a unified hardware and/or software component (for example, a hardware-defined circuitry arrangement including circuitry to perform multiple functions, or a processor configured to execute program code that defines instructions for multiple functions).

As shown in FIG. 8, the receiver 500 may receive 1 to M data signals transmitted from transmitter 700 via physical antennas 801 which may correspond to antenna system 202 of the terminal device 102 or the antenna system 302 of the access node 110. A demapper 802 may reverse the actions of the above described antenna mapper 710 and layer mapper 708 thus converting the received M signals to a number of λ codewords. FIG. 8 exemplarily uses a codeword i (CWi) and a codeword j (CWj) to illustrate the above discussed CW-IC, CWi corresponding to a reference codeword included in the first set of reference codewords and CWj corresponding to a reference codeword included in the second set of reference codewords.

In the illustrated example, as the reference codeword corresponding to CWi is included in the first set of reference codewords, CWi may have passed the error detection (e.g. a CRC), while CWj, its reference codeword being included in the second set of reference codewords, may have not passed the error detection. FIG. 9 shows exemplary method 900 which receiver 500 may execute using the internal configuration shown in FIG. 8.

At stage 902 of FIG. 9, CW-IC is started at the receiver 500 and codewords included in the received signal are decoded at stage 904. The codewords may for example be decoded simultaneously in parallel. At stage 906, for example CWi checker 805 and CWj checker 810 perform error detection on CWi and CWj to determine if the codewords pass the error detection. As CWj does not pass the error detection, the method passes to stage 908. In a case where all codewords would pass the error detection, the method would directly pass to stage 916 and would come to an end.

As CWi has passed the error detection, bits of layer i to which CWi is mapped can be further processed. At stage 908 e.g. a copy of said bits is re-encoded using encoder i 807 and inputted into subtractor j-i 808. The subtractor j-i 808 may then reconstruct the interference that CWi imposes on CWj (stage 910) and cancel this interference from CWj (stage 912). The resulting CWj with cancelled interference from CWi may then be input into decoder j 809 to be encoded at stage 914. The method 900 may be performed for all codewords included in the received signal.

Figure 10A:
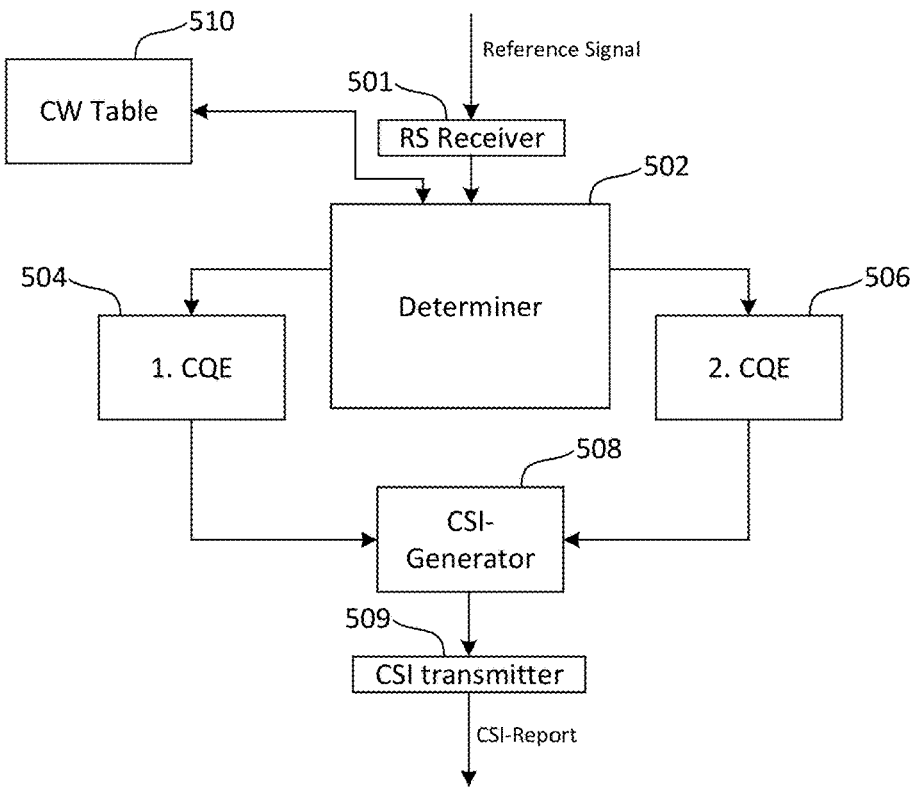
FIG. 10A illustrates the components of FIG. 5 and additionally a CW table in accordance with some aspects.

FIG. 10A illustrates the components of FIG. 5 and additionally a CW table 510. For reasons of conciseness, a description of those components of FIG. 10A depicted also in FIG. 5 is omitted. FIG. 10A relates in particular to aspects in relation to the first and second sets of codewords. As mentioned above, the first and second sets of reference codewords may in various aspects of the present disclosure be statically predefined for every channel quality estimation process in a number of channel quality estimation processes. The determiner may in aspects thus be configured to determine if a codeword corresponds to a reference codeword included in the first set of reference codewords or the second set of reference codewords by referring to such pre-stored codeword table.

As illustrated in FIG. 10A, the receiver may statically store a codeword table e.g. in memory 214 of the terminal device 102, a dedicated memory of the baseband modem 206, or a memory of the communication subsystem 306. The codeword table may e.g. statically assign for example the above discussed CW0 to the first set of reference codewords and CW1 to the second set of reference codewords or vice versa. In a four-reference-codeword configuration, reference codewords 0 and 1 may be assigned to the first set of reference codewords and reference codewords 2 and 3 may be assigned to the second set of reference codewords, or vice versa. In various aspects of the present disclosure, codewords that are expected to pass an error detection such as a CRC with a higher likelihood than other codewords may be assigned to the first set of reference codewords and the remaining codewords may be assigned to the second set of reference codewords. In these aspects, a suitable threshold for said likelihood may be used to separate the codewords into the first and the second set of reference codewords.

Some aspects described herein in relation with a static assignment of reference codewords may result in a more efficient calculation of the CSI. As mentioned above, in a four layer MIMO transmission, a reference codeword CW0 may correspond to two MIMO transmission layers 3 and 4 and a reference codeword CW1 may correspond to two MIMO transmission layers 1 and 2. Channel quality metrics corresponding to the transmission layers may be denoted as $\gamma_4, \gamma_3, \gamma_2, \gamma_1$, whereby $\gamma_4, \gamma_3$ may correspond to CW0 and $\gamma_2, \gamma_1$ may correspond to CW1. As a result of implementation, $\gamma_4$ and $\gamma_3$ may in examples be calculated always before $\gamma_2$ and $\gamma_1$ are calculated, whereby $\gamma_2$ and $\gamma_1$ computation uses parts of the $\gamma_4$ and $\gamma_3$ computation. Thus, if reference codeword CW0 is included in the first set of reference codewords, only $\gamma_4$ and $\gamma_3$ need to be calculated to determine the corresponding CSI for CW0. Since in certain aspects the second channel quality metric only includes rows and columns corresponding to codewords from the second set of reference codewords, in these aspects only $\gamma_2$ and $\gamma_1$ need to be calculated to determine the corresponding CSI for CW1, without computing parts of $\gamma_4$ and $\gamma_3$.

Figure 10B:
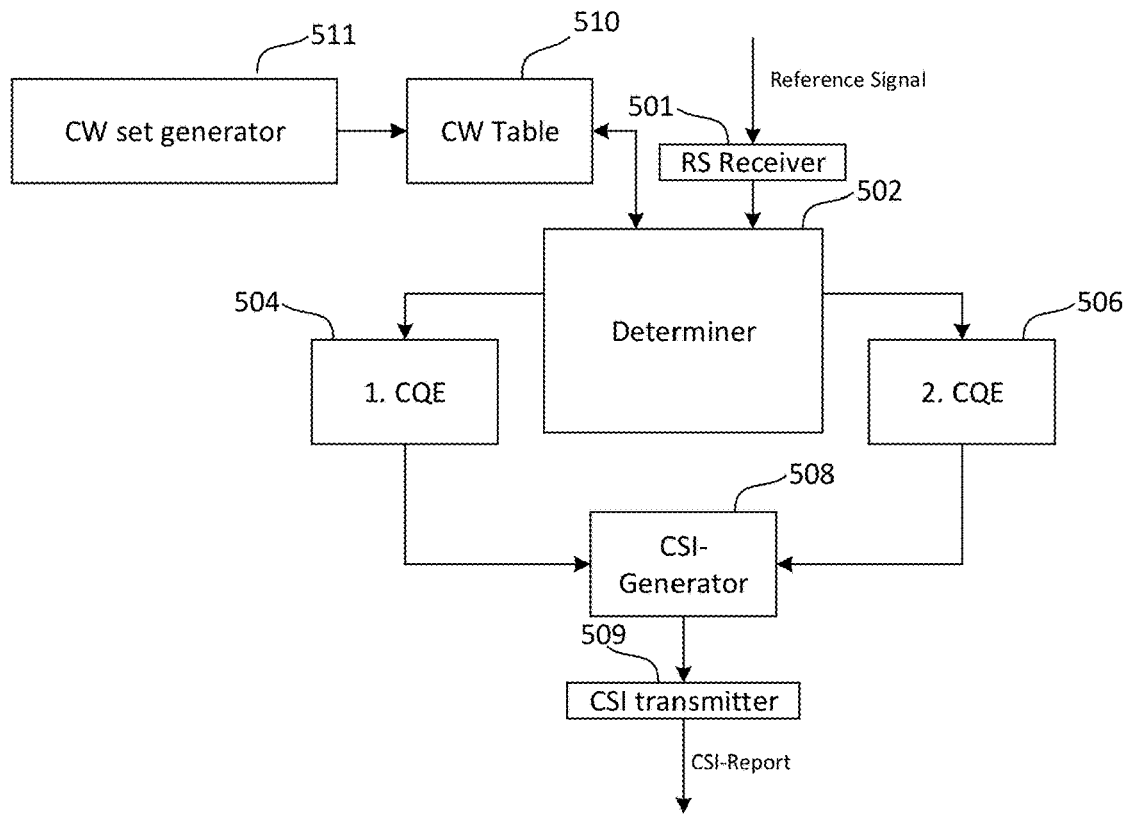
FIG. 10B illustrates the components of FIG. 10A and additionally a CW set generator in accordance with some aspects.

FIG. 10B illustrates the components of FIG. 10A and additionally a CW set generator 511. For reasons of conciseness, a description of those components of FIG. 10B depicted also in FIG. 10A is omitted. FIG. 10B relates in particular to further aspects in relation to the first and second sets of codewords. In various aspects of the present disclosure, codewords may be dynamically assigned to the first set of reference codewords or the second set of reference codewords. To this end, the receiver 500 may be provided with a codeword set generator 511 configured to generate the first set of reference codewords and the second set of reference codewords for use in estimating the first channel quality metric value or the second channel quality metric value. The receiver 500 may then store the generated sets of reference codewords in codeword table 510 and the determiner 502 may then determine if the codeword corresponds to the first set of reference codewords or the second set of reference codewords by referring to the stored codeword table 510.

In various aspects, the codeword set generator 511 is configured to generate the first set of reference codewords and the second set of reference codewords based on channel quality metric values estimated in advance for each codeword included in each data signal. For example, said channel quality metric values may be values estimated in past channel quality estimation processes carried out by the signal processing device, or may be processed values based on values estimated in past channel quality estimation processes carried out by the signal processing device. Processed values may be mean channel quality values or the like.

Figure 11:
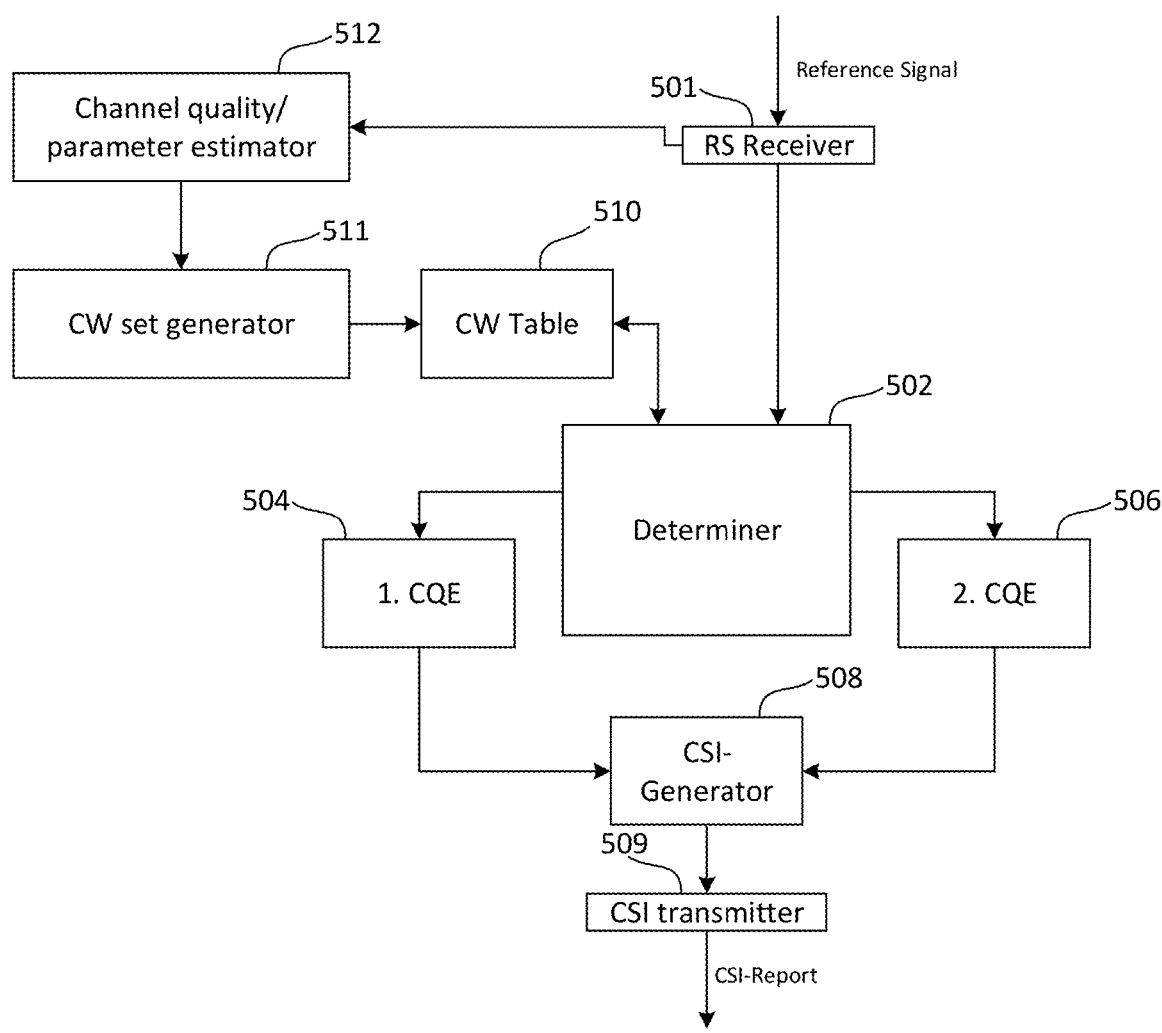
FIG. 11 illustrates the components of FIG. 10B and additionally a current channel quality estimator in accordance with some aspects.

The channel quality metric values estimated in advance may e.g. be channel quality metric values estimated in advance for a current channel quality estimation process or for a past channel quality estimation process. As exemplified in the following referring to FIG. 11, to this end, a channel quality/parameter estimator 512 can be provided in various aspects. The channel quality/parameter estimator 512 is exemplarily illustrated in FIG. 11 in addition to the components of FIG. 10B. For reasons of conciseness, a description of those components of FIG. 11 depicted also in FIG. 10B is omitted. FIG. 11 relates in particular to further aspects in relation to a dynamic assignment of codewords to first and second sets of codewords. In various aspects, the channel quality/parameter estimator 512 can be used to estimate channel quality metric values to be input to the CW set generator 511 based on current, past, or both, current and past reference signals. As illustrated in FIG. 11, in various aspects, the receiver 500 may comprise a channel quality/parameter estimator 512, which is configured to estimate current channel quality metric values for each codeword included in each data signal to be supplied to the codeword set generator 511 based on current, past, or both, current and past reference signals. The codeword set generator 511 may then generate the first set of reference codewords and the second set of reference codewords based on said current channel quality metric values for the current channel quality estimation process to be carried out by the first channel quality estimator 504 and the second channel quality estimator 506.

FIG. 12 illustrates an exemplary method 1200 which receiver 500 may execute using the internal configuration shown in FIG. 11. Stage 1202 and stages 1204 to 1210 correspond to stages 602 to 610 described in the context of FIG. 6 above such that their description will be omitted for conciseness reasons. As depicted in FIG. 12, after having received a reference signal for data signal corresponding to an l-th antenna port, in stage 1202, the channel quality/parameter estimator 512 estimates a channel quality for said data signal in stage 1203. Further, in stage 1203, the estimated channel quality is passed to the codeword set generator 511. If the estimated channel quality is above a predefined threshold, the codeword set generator 511 assigns the reference codeword corresponding to the data signal received via the l-th antenna port to the first set of reference codewords. In these aspects, the codeword set generator 511 may further be configured to store generated first and second sets of reference codewords in the codeword table 510 for the channel quality estimation process. The determiner 502 may in these aspects be configured to determine if the codeword corresponds to a reference codeword included in the first set of reference codewords or the second set of reference codewords by referring to the codeword table.

In various aspects, the codeword set generator 511 may generate the first and the second set of reference codewords based on a variation of channel quality values for each received data signal or transmission layer. The codeword set generator 511 may in various aspects be configured to generate the first set of reference codewords and the second set of reference codewords for use in estimating the first channel quality metric value or the second channel quality metric value based on respective parameters reflecting variations in channel quality for each received data signal or transmission layers. Parameters reflecting variations in channel quality may include a derivative of a function representing respective CQI values for a respective data signal as a function of time. For example, a codeword may be assigned to the first set of reference codewords if for a number of past channel quality values of the data signal corresponding to the codeword, the derivative of a function describing the channel quality value per time is above a predefined threshold. Such parameters may include further metrics reflecting channel variations such as pre-detection/post-detection SINR, mutual information, channel multipath profile or delay spread, and Doppler estimates.

Figure 13A:
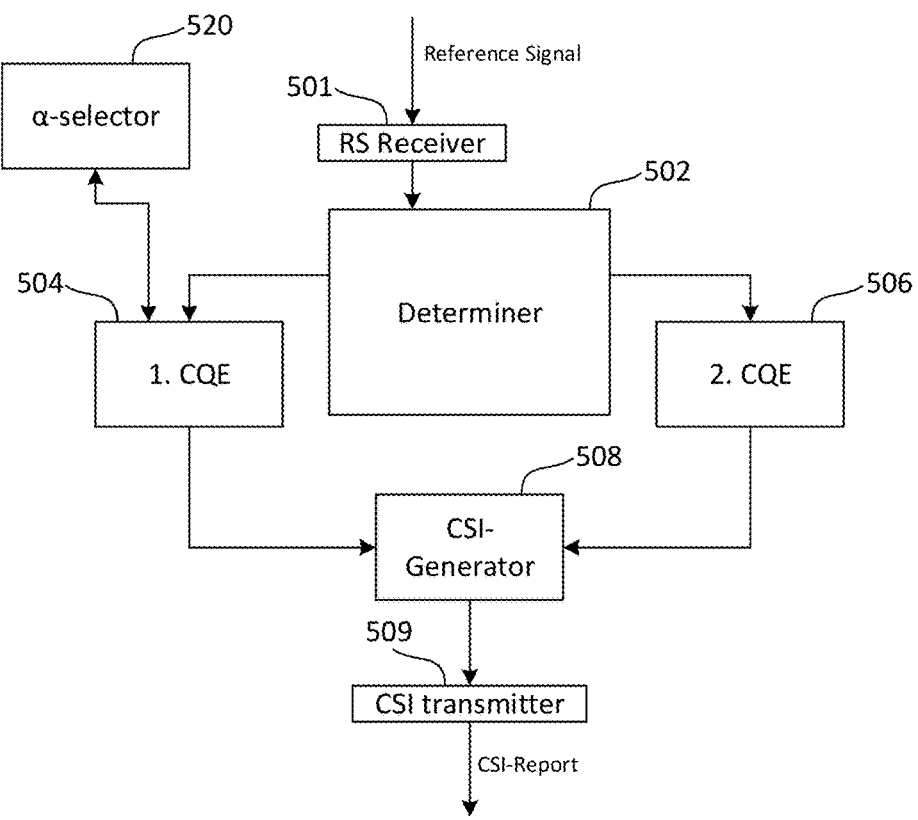
FIG. 13A illustrates the components of FIG. 5 and additionally an α-selector in accordance with some aspects.

FIG. 13A illustrates the components of FIG. 5 and additionally an α-selector 520. For reasons of conciseness, a description of those components of FIG. 13A depicted also in FIG. 5 is omitted. FIG. 13A relates in particular to aspects in relation to a dynamic selection of the damping factor α. In various aspects of the present disclosure, the damping factor α may be dynamically set for each channel quality estimation process. The damping factor α may for example be set based on a rate of transmitted information bits in a previous transmission process. For example, if the damping factor α is set too close to zero, the quality of the robust codewords may be underestimated too much. Thus, an achievable bit rate associated with these robust codewords may be too low to be compensated by the interference-cancelled codewords. On the other hand, if the damping factor α is set too close to 1, a quality of the robust codewords may be insufficient to ensure that the BLER of these codewords stay sufficiently low, i.e. robust, for reliably cancelling interference from the interference-cancelled codewords. Thus, in certain aspects the receiver 500 may be provided with the α-selector 520 to dynamically adjust the damping factor α such that a throughput performance can be kept high.

Figure 13B:
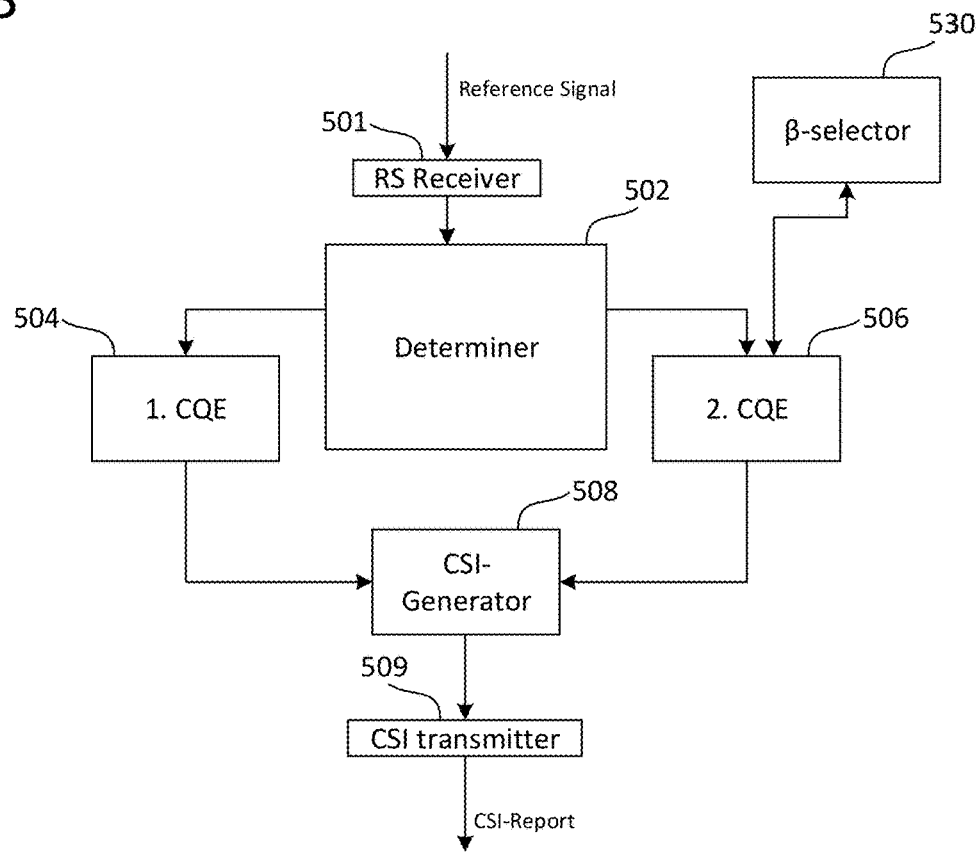
FIG. 13B illustrates the components of FIG. 5 and additionally a β-selector in accordance with some aspects.

FIG. 13B illustrates the components of FIG. 5 and additionally a β-selector 530. For reasons of conciseness, a description of those components of FIG. 13B depicted also in FIG. 5 is omitted. FIG. 13B relates in particular to aspects in relation to a dynamic selection of the damping factor β. In various aspects of the present disclosure, the damping factor β may be dynamically set for each channel quality estimation process. The damping factor β may for example be set based on a rate of transmitted information bits in a previous transmission process. For example, if on the one hand the damping factor β is set too close to 1, the MCS set for the subsequently transmitted codewords may be set too high to be compensable by the CW-IC using the robust codewords. On the other hand, if the damping factor β is set too close to 0, the effect of increasing the MCS may not be sufficient to achieve a noticeable increase in throughput performance. Thus, in certain aspects the receiver 500 may be provided with the β-selector 530 to dynamically adjust the damping factor α such that a throughput performance can be kept high.

In various aspects of this disclosure, the receiver 500 may be provided with the α-selector 520 and the β-selector 530.

Figure 14:
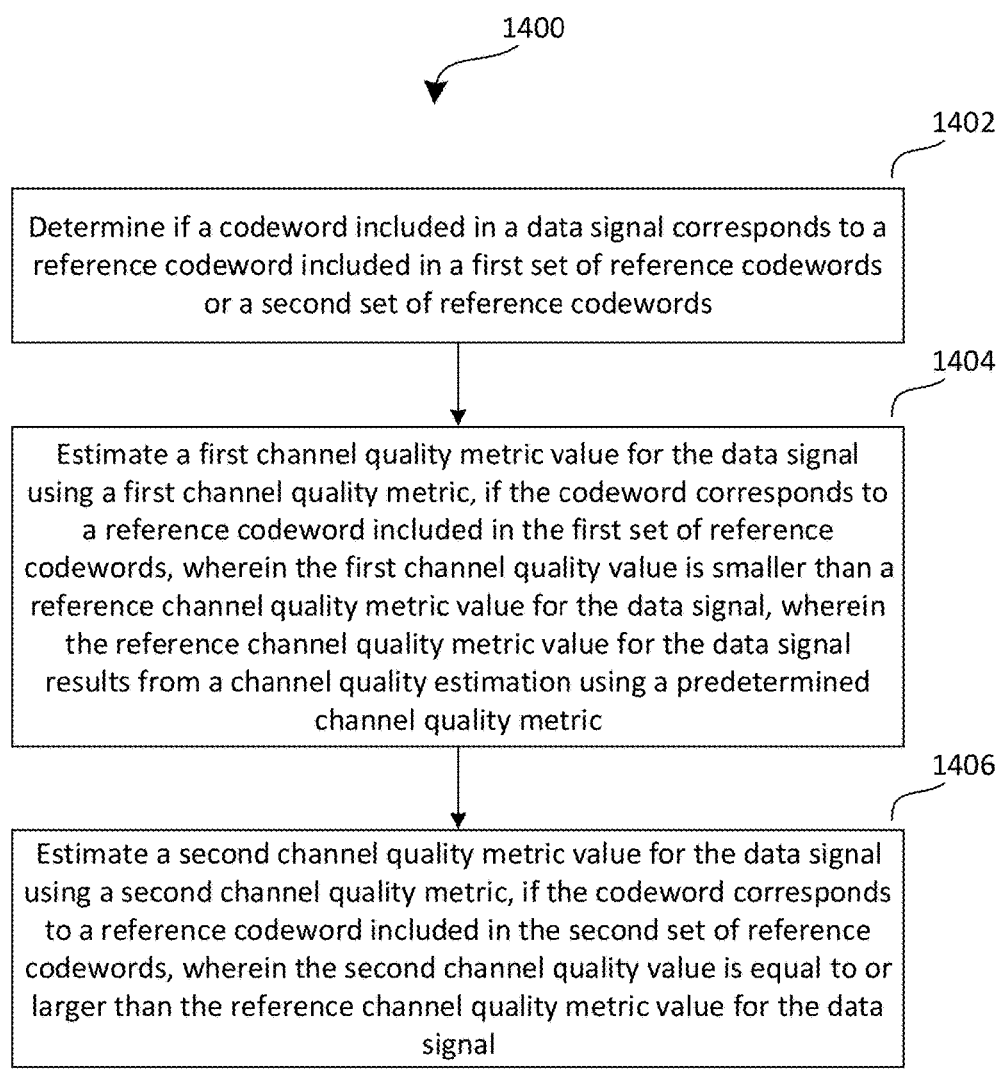
FIG. 14 shows an exemplary signal processing method in accordance with some aspects.

FIG. 14 shows exemplary signal processing method 1400 according to some aspects. As shown in FIG. 14, signal processing method 1400 includes determining if a codeword included in a data signal corresponds to a reference codeword included in a first set of reference codewords or a second set of reference codewords (1402), estimating a first channel quality metric value for the data signal using a first channel quality metric, if the codeword corresponds to a reference codeword included in the first set of reference codewords, wherein the first channel quality value is smaller than a reference channel quality metric value for the data signal, wherein the reference channel quality metric value for the data signal results from a channel quality estimation using a predetermined channel quality metric (1404), and estimating a second channel quality metric value for the data signal using a second channel quality metric, if the codeword corresponds to a reference codeword included in the second set of reference codewords, wherein the second channel quality value is equal to or larger than the reference channel quality metric value for the data signal (1406).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

The subject matter of Example 1 is a signal processing device including: a determiner configured to determine if a codeword included in a data signal corresponds to a reference codeword included in a first set of reference codewords or a second set of reference codewords; first estimator configured to estimate a first channel quality metric value for the data signal based on a first channel quality metric, if the codeword corresponds to a reference codeword included in the first set of reference codewords, wherein the first channel quality value is smaller than a reference channel quality metric value for the data signal; and a second estimator configured to estimate a second channel quality metric value for the data signal based on a second channel quality metric, if the codeword corresponds to a reference codeword included in the second set of reference codewords, wherein the second channel quality value is equal to or larger than the reference channel quality metric value for the data signal.

In Example 2, the subject matter of Example 1 can optionally include wherein the reference channel quality metric value for the data signal results from a channel quality estimation based on a predetermined channel quality metric.

In Example 3, the subject matter of Example 2 can optionally include wherein the predetermined channel quality metric is predetermined for each data signal received via each respective one of at least two antenna ports.

In Example 4, the subject matter of Example 3 can optionally include wherein each data signal received via each respective one of the at least two antenna ports is associated with one and only one reference codeword, each reference codeword being included in the first set of reference codewords or the second set of reference codewords.

In Example 5, the subject matter of any one of Examples 1 to 4 can optionally include wherein the determiner is configured to determine if a codeword included in a received data signal corresponds to a reference codeword included in the first set of reference codewords or the second set of reference codewords by referring to identification information identifying the received codeword, e.g. identifying the data signal to be received via the one of the at least two antenna ports.

In Example 6, the subject matter of any one of Examples 1 to 5 can optionally include wherein the predetermined channel quality metric is a signal-to-interference-and-noise-ratio for the data signal.

In Example 7, the subject matter of any one of Examples 1 to 6 can optionally include wherein the determiner is further configured to determine if the codeword corresponds to a reference codeword included in the first set of reference codewords or the second set of reference codewords by referring to a pre-stored reference codeword table.

In Example 8, the subject matter of any one of Examples 1 to 7 can optionally include a codeword set generator configured to generate the first set of reference codewords and the second set of reference codewords for use in estimating the first channel quality metric value or the second channel quality metric value; a controller configured to store the generated first set of reference codewords and second set of reference codewords in a reference codeword table; whereby the determiner is configured to determine if the codeword corresponds to the first set of reference codewords or the second set of reference codewords by referring to the stored codeword table.

In Example 9, the subject matter of Example 8 can optionally include wherein the codeword set generator is configured to generate the first set of reference codewords and the second set of reference codewords for use in estimating the first channel quality metric value or the second channel quality metric value based on channel quality metric values estimated in advance for each codeword included in each data signal received via each respective one of the at least two antenna ports.

In Example 10, the subject matter of Example 8 can optionally include wherein the codeword set generator is configured to generate the first set of reference codewords and the second set of reference codewords for use in estimating the first channel quality metric value or the second channel quality metric value based on respective parameters reflecting variations in channel quality for each data signal received via each respective one of the at least two antenna ports.

In Example 11, the subject matter of any one of Examples 1 to 10 can optionally include wherein the second channel quality metric $\tilde{\gamma}_{2,l}$ for an l-th data signal is expressed as $$\tilde{\gamma}_{2,l} = \beta \cdot \gamma(l|c \in C_2), \text{ wherein}$$

$$\gamma(l \mid c \in C_2) = \frac{1}{\left[\left(\acute{H}^H \acute{H} + I\right)^{-1}\right]_{l,l}} - 1, l \in \{0, \ldots, L_2\},$$

wherein $\acute{H}$ is a sub-matrix of a channel estimate matrix H, H having v columns, v being the number of data signals received via each of the at least two antenna ports, wherein $\acute{H}$ is formed by rows and columns of H corresponding to a number ($L_2$) of data signals corresponding to reference codewords included only in the second set ($C_2$) of reference codewords, the notation $(\bullet)^H$ denotes a conjugate transpose operation, I is the identity matrix of the same dimension as $\acute{H}$, and $[\ldots]_{l,l}$ denotes the l-th diagonal element of matrix $[\ldots]$ and $\beta$ is a further damping factor, $0<\beta\leq 1$.

The subject matter of Example 12 is a wireless communication device including: a transceiver configured to wirelessly receive a data signal including a codeword; and a signal processor including: a determiner configured to determine if the codeword included in the data signal corresponds to a reference codeword included in a first set of reference codewords or a second set of reference codewords; a first estimator configured to estimate a first channel quality metric value for the data signal based on a first channel quality metric, if the codeword corresponds to a reference codeword included in the first set of reference codewords, wherein the first channel quality value is smaller than a reference channel quality metric value for the data signal; and a second estimator configured to estimate a second channel quality metric value for the data signal based on a second channel quality metric, if the codeword corresponds to a reference codeword included in the second set of reference codewords, wherein the second channel quality value is equal to or larger than the reference channel quality metric value for the data signal.

In Example 13, the subject matter of Example 12 can optionally include wherein the reference channel quality metric value for the data signal results from a channel quality estimation based on a predetermined channel quality metric.

In Example 14, the subject matter of Example 13 can optionally include wherein the predetermined channel quality metric is predetermined for each data signal received via each respective one of at least two antenna ports.

In Example 15, the subject matter of Example 14 can optionally include wherein each data signal received via each respective one of the at least two antenna ports is associated with one and only one reference codeword, each reference codeword being included in the first set of reference codewords or the second set of reference codewords.

In Example 16, the subject matter of any one of Examples 12 to 15 can optionally include wherein the determiner is configured to determine if a codeword included in a received data signal corresponds to a reference codeword included in the first set of reference codewords or the second set of reference codewords by referring to identification information identifying the received codeword, e.g. identifying the data signal to be received via the one of the at least two antenna ports.

In Example 17, the subject matter of any one of Examples 13 to 16 can optionally include wherein the predetermined channel quality metric is a signal-to-interference-and-noise-ratio for the data signal.

In Example 18, the subject matter of any one of Examples 12 to 17 can optionally include wherein the determiner is further configured to determine if the codeword corresponds to a reference codeword included in the first set of reference codewords or the second set of reference codewords by referring to a pre-stored reference codeword table.

In Example 19, the subject matter of any one of Examples 12 to 18 can optionally include: a codeword set generator configured to generate the first set of reference codewords and the second set of reference codewords for use in estimating the first channel quality metric value or the second channel quality metric value; a controller configured to store the generated first set of reference codewords and second set of reference codewords in a reference codeword table; whereby the determiner is configured to determine if the codeword corresponds to the first set of reference codewords or the second set of reference codewords by referring to the stored codeword table.

In Example 20, the subject matter of Example 19 can optionally include wherein the codeword set generator is configured to generate the first set of reference codewords and the second set of reference codewords for use in estimating the first channel quality metric value or the second channel quality metric value based on channel quality metric values estimated in advance for each codeword included in each data signal received via each respective one of the at least two antenna ports.

In Example 21, the subject matter of Example 19 can optionally include wherein the codeword set generator is configured to generate the first set of reference codewords and the second set of reference codewords for use in estimating the first channel quality metric value or the second channel quality metric value based on respective parameters reflecting variations in channel quality for each data signal received via each respective one of the at least two antenna ports.

In Example 22, the subject matter of any one of Examples 12 to 21 can optionally include wherein the second channel quality metric $\tilde{\gamma}_{2,l}$ for an l-th data signal is expressed as $$\tilde{\gamma}_{2,l} = \beta \cdot \gamma(l | c \in C_2), \text{ wherein}$$

$$\gamma(l | c \in C_2) = \frac{1}{\left[\left(\acute{H}^H \acute{H} + I\right)^{-1}\right]_{l,l}} - 1, l \in \{0, \ldots, L_2\},$$

wherein $\acute{H}$ is a sub-matrix of a channel estimate matrix H, H having v columns, v being the number of data signals received via each of the at least two antenna ports, wherein $\acute{H}$ is formed by rows and columns of H corresponding to a number ($L_2$) of data signals corresponding to reference codewords included only in the second set ($C_2$) of reference codewords, the notation $(\bullet)^H$ denotes a conjugate transpose operation, I is the identity matrix of the same dimension as $\acute{H}$, and $[\ldots]_{l,l}$ denotes the l-th diagonal element of matrix $[\ldots]$ and $\beta$ is a further damping factor, $0<\beta\leq1$.

The subject matter of Example 23 is a network access node including: a transceiver configured to wirelessly receive a data signal including a codeword; and a signal processor including: a determiner configured to determine if the codeword included in the data signal corresponds to a reference codeword included in a first set of reference codewords or a second set of reference codewords; a first estimator configured to estimate a first channel quality metric value for the data signal based on a first channel quality metric, if the codeword corresponds to a reference codeword included in the first set of reference codewords, wherein the first channel quality value is smaller than a reference channel quality metric value for the data signal; and a second estimator configured to estimate a second channel quality metric value for the data signal based on a second channel quality metric, if the codeword corresponds to a reference codeword included in the second set of reference codewords, wherein the second channel quality value is equal to or larger than the reference channel quality metric value for the data signal.

In Example 24, the subject matter of Example 23 can optionally include wherein the reference channel quality metric value for the data signal results from a channel quality estimation based on a predetermined channel quality metric.

In Example 25, the subject matter of Example 24 can optionally include wherein the predetermined channel quality metric is predetermined for each data signal received via each respective one of at least two antenna ports.

In Example 26, the subject matter of Example 25 can optionally include wherein each data signal received via each respective one of the at least two antenna ports is associated with one and only one reference codeword, each reference codeword being included in the first set of reference codewords or the second set of reference codewords.

In Example 27, the subject matter of any one of Examples 23 to 26 can optionally include wherein the determiner is configured to determine if a codeword included in a received data signal corresponds to a reference codeword included in the first set of reference codewords or the second set of reference codewords by referring to identification information identifying the received codeword, e.g. identifying the data signal to be received via the one of the at least two antenna ports.

In Example 28, the subject matter of any one of Examples 24 to 27 can optionally include wherein the predetermined channel quality metric is a signal-to-interference-and-noise-ratio for the data signal.

In Example 29, the subject matter of any one of Examples 23 to 28 can optionally include wherein the determiner is further configured to determine if the codeword corresponds to a reference codeword included in the first set of reference codewords or the second set of reference codewords by referring to a pre-stored reference codeword table.

In Example 30, the subject matter of any one of Examples 23 to 29 can optionally include: a codeword set generator configured to generate the first set of reference codewords and the second set of reference codewords for use in estimating the first channel quality metric value or the second channel quality metric value; a controller configured to store the generated first set of reference codewords and second set of reference codewords in a reference codeword table; whereby the determiner is configured to determine if the codeword corresponds to the first set of reference codewords or the second set of reference codewords by referring to the stored codeword table.

In Example 31, the subject matter of Example 30 can optionally include wherein the codeword set generator is configured to generate the first set of reference codewords and the second set of reference codewords for use in estimating the first channel quality metric value or the second channel quality metric value based on channel quality metric values estimated in advance for each codeword included in each data signal received via each respective one of the at least two antenna ports.

In Example 32, the subject matter of Example 30 can optionally include wherein the codeword set generator is configured to generate the first set of reference codewords and the second set of reference codewords for use in estimating the first channel quality metric value or the second channel quality metric value based on respective parameters reflecting variations in channel quality for each data signal received via each respective one of the at least two antenna ports.

In Example 33, the subject matter of any one of Examples 23 to 32 can optionally include wherein the second channel quality metric $\tilde{\gamma}_{2,l}$ for an l-th data signal is expressed as $\tilde{\gamma}_{2,l} = \beta \cdot \gamma(l|c \in C_2)$, wherein $$\gamma(l \mid c \in C_2) = \frac{1}{\left[\left(\tilde{H}^H \tilde{H} + I\right)^{-1}\right]_{l,l}} - 1, l \in \{0, \ldots, L_2\},$$

wherein $\tilde{H}$ is a sub-matrix of a channel estimate matrix H, H having v columns and v being the number of data signals received via each of the at least two antenna ports, wherein $\tilde{H}$ is formed by rows and columns of H corresponding to a number $(L_2)$ of data signals corresponding to reference codewords included only in the second set $(C_2)$ of reference codewords, the notation $(\cdot)^H$ denotes a conjugate transpose operation, I is the identity matrix of the same dimension as $\tilde{H}$ and $[ \ldots ]_{l,l}$ denotes the l-th diagonal element of matrix $[ \ldots ]$ and $\beta$ is a further damping factor, $0<\beta\leq1$.

The subject matter of Example 34 is a signal processing device including: one or more processors configured to: determine if a codeword included in a data signal corresponds to a reference codeword included in a first set of reference codewords or a second set of reference codewords; estimate a first channel quality metric value for the data signal based on a first channel quality metric, if the codeword corresponds to a reference codeword included in the first set of reference codewords, wherein the first channel quality value is smaller than a reference channel quality metric value for the data signal; and estimate a second channel quality metric value for the data signal based on a second channel quality metric, if the codeword corresponds to a reference codeword included in the second set of reference codewords, wherein the second channel quality value is equal to or larger than the reference channel quality metric value for the data signal.

In Example 35, the subject matter of Example 34 can optionally include wherein the reference channel quality metric value for the data signal results from a channel quality estimation based on a predetermined channel quality metric.

In Example 36, the subject matter of Example 35 can optionally include wherein the predetermined channel quality metric is predetermined for each data signal received via each respective one of at least two antenna ports.

In Example 37, the subject matter of Example 36 can optionally include wherein each data signal received via each respective one of the at least two antenna ports is associated with one and only one reference codeword, each reference codeword being included in the first set of reference codewords or the second set of reference codewords.

In Example 38, the subject matter of any one of Examples 34 to 37 can optionally include wherein the one or more processors are configured to determine if a codeword included in a received data signal corresponds to a reference codeword included in the first set of reference codewords or the second set of reference codewords by referring to identification information identifying the received codeword, e.g. identifying the data signal to be received via the one of the at least two antenna ports.

In Example 39, the subject matter of any one of Examples 35 to 38 can optionally include wherein the predetermined channel quality metric is a signal-to-interference-and-noise-ratio for the data signal.

In Example 40, the subject matter of any one of Examples 34 to 39 can optionally include wherein the one or more processors are further configured to determine if the codeword corresponds to a reference codeword included in the first set of reference codewords or the second set of reference codewords by referring to a pre-stored reference codeword table.

In Example 41, the subject matter of any one of Examples 34 to 40 can optionally include wherein the one or more processors are further configured to generate the first set of reference codewords and the second set of reference codewords for use in estimating the first channel quality metric value or the second channel quality metric value; store the generated first set of reference codewords and second set of reference codewords in a reference codeword table; and determine if the codeword corresponds to the first set of reference codewords or the second set of reference codewords by referring to the stored codeword table.

In Example 42, the subject matter Example 41 can optionally include wherein the one or more processors are configured to generate the first set of reference codewords and the second set of reference codewords for use in estimating the first channel quality metric value or the second channel quality metric value based on channel quality metric values estimated in advance for each codeword included in each data signal received via each respective one of the at least two antenna ports.

In Example 43, the subject matter Example 41 can optionally include wherein the one or more processors are configured to generate the first set of reference codewords and the second set of reference codewords for use in estimating the first channel quality metric value or the second channel quality metric value based on respective parameters reflecting variations in channel quality for each data signal received via each respective one of the at least two antenna ports.

In Example 44, the subject matter of any one of Examples 34 to 43 can optionally include wherein the second channel quality metric $\tilde{\gamma}_{2,l}$ for an l-th data signal is expressed as $$\tilde{\gamma}_{2,l} = \beta \cdot \gamma(l|c \in C_2), \text{ wherein}$$

$$\gamma(l \mid c \in C_2) = \frac{1}{\left[\left(\acute{H}^H \acute{H} + I\right)^{-1}\right]_{l,l}} - 1, l \in \{0, \ldots, L_2\},$$

wherein $\acute{H}$ is a sub-matrix of a channel estimate matrix H, H having v columns and v being the number of data signals received via each of the at least two antenna ports, wherein $\acute{H}$ is formed by rows and columns of H corresponding to a number ($L_2$) of data signals corresponding to reference codewords included only in the second set ($C_2$) of reference codewords, the notation $(\cdot)^H$ denotes a conjugate transpose operation, I is the identity matrix of the same dimension as $\acute{H}$ and $[\ldots]_{l,l}$ denotes the l-th diagonal element of matrix $[\ldots]$ and $\beta$ is a further damping factor, $0<\beta\leq 1$.

The subject matter of Example 45 is a wireless communication device including: a transceiver configured to wirelessly receive a data signal including a codeword; and a signal processor including: one or more processors configured to: determine if the codeword included in the data signal corresponds to a reference codeword included in a first set of reference codewords or a second set of reference codewords; estimate a first channel quality metric value for the data signal based on a first channel quality metric, if the codeword corresponds to a reference codeword included in the first set of reference codewords, wherein the first channel quality value is smaller than a reference channel quality metric value for the data signal; and estimate a second channel quality metric value for the data signal based on a second channel quality metric, if the codeword corresponds to a reference codeword included in the second set of reference codewords, wherein the second channel quality value is equal to or larger than the reference channel quality metric value for the data signal.

In Example 46, the subject matter of Example 45 can optionally include wherein the reference channel quality metric value for the data signal results from a channel quality estimation based on a predetermined channel quality metric.

In Example 47, the subject matter of Example 46 can optionally include wherein the predetermined channel quality metric is predetermined for each data signal received via each respective one of at least two antenna ports.

In Example 48, the subject matter of Example 47 can optionally include wherein each data signal received via each respective one of the at least two antenna ports is associated with one and only one reference codeword, each reference codeword being included in the first set of reference codewords or the second set of reference codewords.

In Example 49, the subject matter of any one of Examples 45 to 48 can optionally include wherein the one or more processors are configured to determine if a codeword included in a received data signal corresponds to a reference codeword included in the first set of reference codewords or the second set of reference codewords by referring to identification information identifying the received codewords, e.g. identifying the data signal to be received via the one of the at least two antenna ports.

In Example 50, the subject matter of any one of Examples 46 to 49 can optionally include wherein the predetermined channel quality metric is a signal-to-interference-and-noise-ratio for the data signal.

In Example 51, the subject matter of any one of Examples 45 to 50 can optionally include wherein the one or more processors are further configured to determine if the codeword corresponds to a reference codeword included in the first set of reference codewords or the second set of reference codewords by referring to a pre-stored reference codeword table.

In Example 52, the subject matter of any one of Examples 45 to 51 can optionally include wherein the one or more processors are further configured to generate the first set of reference codewords and the second set of reference codewords for use in estimating the first channel quality metric value or the second channel quality metric value; store the generated first set of reference codewords and second set of reference codewords in a reference codeword table; and determine if the codeword corresponds to the first set of reference codewords or the second set of reference codewords by referring to the stored codeword table.

In Example 53, the subject matter of Example 52 can optionally include wherein the one or more processors are configured to generate the first set of reference codewords and the second set of reference codewords for use in estimating the first channel quality metric value or the second channel quality metric value based on channel quality metric values estimated in advance for each codeword included in each data signal received via each respective one of the at least two antenna ports.

In Example 54, the subject matter of Example 52 can optionally include wherein the one or more processors are configured to generate the first set of reference codewords and the second set of reference codewords for use in estimating the first channel quality metric value or the second channel quality metric value based on respective parameters reflecting variations in channel quality for each data signal received via each respective one of the at least two antenna ports.

In Example 55, the subject matter of any one of Examples 45 to 54 can optionally include wherein the second channel quality metric $\tilde{\gamma}_{2,l}$ for an l-th data signal is expressed as $\tilde{\gamma}_{2,l} = \beta \cdot \gamma(l|c \in C_2)$, wherein $$\gamma(l|c \in C_2) = \frac{1}{\left[\left(\acute{H}^H \acute{H} + I\right)^{-1}\right]_{l,l}} - 1, l \in \{0, \ldots, L_2\},$$

wherein Ĥ is a sub-matrix of a channel estimate matrix H, H having v columns and v being the number of data signals received via each of the at least two antenna ports, wherein Ĥ is formed by rows and columns of H corresponding to a number ($L_2$) of data signals corresponding to reference codewords included only in the second set ($C_2$) of reference codewords, the notation $(\cdot)^H$ denotes a conjugate transpose operation, I is the identity matrix of the same dimension as Ĥ and $[\ldots]_{l,l}$ denotes the l-th diagonal element of matrix $[\ldots]$ and β is a further damping factor, $0 < \beta \leq 1$.

The subject matter of Example 56 is a network access node including: a transceiver configured to wirelessly receive a data signal including a codeword; and a signal processor including: one or more processors configured to: determine if the codeword included in the data signal corresponds to a reference codeword included in a first set of reference codewords or a second set of reference codewords; estimate a first channel quality metric value for the data signal based on a first channel quality metric, if the codeword corresponds to a reference codeword included in the first set of reference codewords, wherein the first channel quality value is smaller than a reference channel quality metric value for the data signal; and estimate a second channel quality metric value for the data signal based on a second channel quality metric, if the codeword corresponds to a reference codeword included in the second set of reference codewords, wherein the second channel quality value is equal to or larger than the reference channel quality metric value for the data signal.

In Example 57, the subject matter of Example 56 can optionally include wherein the reference channel quality metric value for the data signal results from a channel quality estimation based on a predetermined channel quality metric.

In Example 58, the subject matter of Example 57 can optionally include wherein the predetermined channel quality metric is predetermined for each data signal received via each respective one of at least two antenna ports.

In Example 59, the subject matter of Example 58 can optionally include wherein each data signal received via each respective one of the at least two antenna ports is associated with one and only one reference codeword, each reference codeword being included in the first set of reference codewords or the second set of reference codewords.

In example 60, the subject matter of any one of Examples 56 to 59 can optionally include wherein the one or more processors are configured to determine if a codeword included in a received data signal corresponds to a reference codeword included in the first set of reference codewords or the second set of reference codewords by referring to identification information identifying the received codeword, e.g. identifying the data signal to be received via the one of the at least two antenna ports.

In example 61, the subject matter of any one of Examples 57 to 60 can optionally include wherein the predetermined channel quality metric is a signal-to-interference-and-noise-ratio for the data signal.

In example 62, the subject matter of any one of Examples 56 to 61 can optionally include wherein the one or more processors are further configured to determine if the codeword corresponds to a reference codeword included in the first set of reference codewords or the second set of reference codewords by referring to a pre-stored reference codeword table.

In example 63, the subject matter of any one of Examples 56 to 62 can optionally include wherein the one or more processors are further configured to generate the first set of reference codewords and the second set of reference codewords for use in estimating the first channel quality metric value or the second channel quality metric value; store the generated first set of reference codewords and second set of reference codewords in a reference codeword table; and determine if the codeword corresponds to the first set of reference codewords or the second set of reference codewords by referring to the stored codeword table.

In example 64, the subject matter of Example 63 can optionally include wherein the one or more processors are configured to generate the first set of reference codewords and the second set of reference codewords for use in estimating the first channel quality metric value or the second channel quality metric value based on channel quality metric values estimated in advance for each codeword included in each data signal received via each respective one of the at least two antenna ports.

In example 65, the subject matter of Example 63 can optionally include wherein the one or more processors are configured to generate the first set of reference codewords and the second set of reference codewords for use in estimating the first channel quality metric value or the second channel quality metric value based on respective parameters reflecting variations in channel quality for each data signal received via each respective one of the at least two antenna ports.

In example 66, the subject matter of any one of Examples 56 to 65 can optionally include wherein the second channel quality metric $\tilde{\gamma}_{2,l}$ for an l-th data signal is expressed as $\tilde{\gamma}_{2,l} = \beta \cdot \gamma(l|c \in C_2)$, wherein $$\gamma(l|c \in C_2) = \frac{1}{\left[\left(\acute{H}^H \acute{H} + I\right)^{-1}\right]_{l,l}} - 1, l \in \{0, \ldots, L_2\},$$

wherein Ĥ is a sub-matrix of a channel estimate matrix H, H having v columns and v being the number of data signals received via each of the at least two antenna ports, wherein Ĥ is formed by rows and columns of H corresponding to a number ($L_2$) of data signals corresponding to reference codewords included only in the second set ($C_2$) of reference codewords, the notation $(.)^H$ denotes a conjugate transpose operation, I is the identity matrix of the same dimension as Ĥ and $[\ldots]_{l,l}$ denotes the l-th diagonal element of matrix $[\ldots]$ and β is a further damping factor, $0 < \beta \leq 1$.

The subject matter of Example 67 is a signal processing method including: determining if a codeword included in a data signal corresponds to a reference codeword included in a first set of reference codewords or a second set of reference codewords; estimating a first channel quality metric value for the data signal based on a first channel quality metric, if the codeword corresponds to a reference codeword included in the first set of reference codewords, wherein the first channel quality value is smaller than a reference channel quality metric value for the data signal; and estimating a second channel quality metric value for the data signal based on a second channel quality metric, if the codeword corresponds to a reference codeword included in the second set of reference codewords, wherein the second channel quality value is equal to or larger than the reference channel quality metric value for the data signal.

In example 68, the subject matter of Example 67 can optionally include wherein the reference channel quality metric value for the data signal results from a channel quality estimation based on a predetermined channel quality metric.

In example 69, the subject matter of Example 68 can optionally include wherein the predetermined channel quality metric is predetermined for each data signal received via each respective one of at least two antenna ports.

In example 70, the subject matter of Example 69 can optionally include wherein each data signal received via each respective one of the at least two antenna ports is associated with one and only one reference codeword, each reference codeword being included in the first set of reference codewords or the second set of reference codewords.

In example 71, the subject matter of any one of Examples 67 to 70 can optionally include wherein the determining if a received codeword corresponds to a reference codeword included in the first set of reference codewords or the second set of reference codewords includes referring to identification information identifying the received codeword, e.g. identifying the data signal to be received via the one of the at least two antenna ports.

In example 72, the subject matter of any one of Examples 68 to 71 can optionally include wherein the predetermined channel quality metric is a signal-to-interference-and-noise-ratio for the data signal.

In example 73, the subject matter of any one of Examples 67 to 72 can optionally include wherein the determining if the codeword corresponds to a reference codeword included in the first set of reference codewords or the second set of reference codewords includes referring to a pre-stored reference codeword table.

In example 74, the subject matter of any one of Examples 67 to 73 can optionally further include: generating the first set of reference codewords and the second set of reference codewords for use in estimating the first channel quality metric value or the second channel quality metric value; storing the generated first set of reference codewords and second set of reference codewords in a reference codeword table; and determining if the codeword corresponds to the first set of reference codewords or the second set of reference codewords by referring to the stored codeword table.

In example 75, the subject matter of Example 74 can optionally further include:

generating the first set of reference codewords and the second set of reference codewords for use in estimating the first channel quality metric value or the second channel quality metric value based on channel quality metric values estimated in advance for each codeword included in each data signal received via each respective one of the at least two antenna ports.

In example 76, the subject matter of Example 74 can optionally further include: generating the first set of reference codewords and the second set of reference codewords for use in estimating the first channel quality metric value or the second channel quality metric value based on respective parameters reflecting variations in channel quality for each data signal received via each respective one of the at least two antenna ports.

In example 77, the subject matter of any one of Examples 67 to 76 can optionally include wherein the second channel quality metric $\tilde{\gamma}_{2,l}$ for an l-th data signal is expressed as $\tilde{\gamma}_{2,l} = \beta \cdot \gamma(l|c \in C_2)$, wherein $$\gamma(l \mid c \in C_2) = \frac{1}{\left[\left(\acute{H}^H \acute{H} + I\right)^{-1}\right]_{l,l}} - 1, l \in \{0, \ldots, L_2\},$$

wherein $\acute{H}$ is a sub-matrix of a channel estimate matrix H, H having v columns and v being the number of data signals received via each of the at least two antenna ports, wherein $\acute{H}$ is formed by rows and columns of H corresponding to a number ($L_2$) of data signals corresponding to reference codewords included only in the second set ($C_2$) of reference codewords, the notation $(\bullet)^H$ denotes a conjugate transpose operation, I is the identity matrix of the same dimension as $\acute{H}$ and $[\ldots]_{l,l}$ denotes the l-th diagonal element of matrix $[\ldots]$ and $\beta$ is a further damping factor, $0<\beta\leq1$.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A signal processing device comprising one or more processors configured to: determine if a codeword included in a data signal corresponds to a reference codeword included in a first set of reference codewords or a second set of reference codewords; estimate a first channel quality metric value for the data signal based on a first channel quality metric, if the codeword corresponds to a reference codeword included in the first set of reference codewords, wherein the first channel quality metric value is smaller than a reference channel quality metric value for the data signal, wherein the first channel quality metric is estimated by modifying the reference channel quality metric value by a first factor in order to decrease a modulation and coding scheme (MCS) value associated with codewords of the first set of reference codewords; and estimate a second channel quality metric value for the data signal based on a second channel quality metric, if the codeword corresponds to a reference codeword included in the second set of reference codewords, wherein the second channel quality metric value is equal to or larger than the reference channel quality metric value for the data signal, wherein the second channel quality metric $\tilde{\gamma}_{2,l}$ for an l-th data signal is expressed as $\gamma_{2,l} = \beta \cdot \gamma(l|c \in C_2)$, wherein $$\gamma(l \mid c \in C_2) = \frac{1}{\left[\left(\acute{H}^H \acute{H} + I\right)^{-1}\right]_{l,l}} - 1, l \in \{0, \ldots, L_2\},$$

wherein $\acute{H}$ is a sub-matrix of a channel estimate matrix H, H having v rows and v being the number of data signals received via each of the at least two antenna ports, wherein $\acute{H}$ is formed by rows and columns of H corresponding to a number ($L_2$) of data signals corresponding to reference codewords included only in the second set ($C_2$) of reference codewords, the notation $(\bullet)^H$ denotes a conjugate transpose operation, I is the identity matrix of the same dimension as Ĥ, and [ . . . ]$_{l,l}$ denotes the l-th diagonal element of matrix [ . . . ] and β is a further damping factor, wherein 0<β≤1.

2. The signal processing device of claim 1, wherein the reference channel quality metric value for the data signal results from a channel quality estimation based on a predetermined channel quality metric.

3. The signal processing device of claim 2, wherein the predetermined channel quality metric is predetermined for each data signal received via each respective one of at least two antenna ports.

4. The signal processing device of claim 3, wherein each data signal received via each respective one of the at least two antenna ports is associated with one and only one reference codeword, each reference codeword being included in the first set of reference codewords or the second set of reference codewords.

5. The signal processing device of claim 1, the one or more processors further configured to determine if a codeword included in a received data signal corresponds to a reference codeword included in the first set of reference codewords or the second set of reference codewords by referring to identification information identifying the received codeword.

6. The signal processing device of claim 2, wherein the predetermined channel quality metric is a signal-to-interference-and-noise-ratio for the data signal.

7. The signal processing device of claim 1, the one or more processors further configured to determine if the codeword corresponds to a reference codeword included in the first set of reference codewords or the second set of reference codewords by referring to a pre-stored reference codeword table.

8. The signal processing device of claim 1, the one or more processors further configured to:
generate the first set of reference codewords and the second set of reference codewords for use in estimating the first channel quality metric value or the second channel quality metric value;
store the generated first set of reference codewords and second set of reference codewords in a reference codeword table; and
determine if the codeword corresponds to the first set of reference codewords or the second set of reference codewords by referring to the stored codeword table.

9. The signal processing device of claim 8, the one or more processors further configured to generate the first set of reference codewords and the second set of reference codewords for use in estimating the first channel quality metric value or the second channel quality metric value based on channel quality metric values estimated in advance for each codeword included in each data signal received via each respective one of the at least two antenna ports.

10. The signal processing device of claim 8, the one or more processors further configured to generate the first set of reference codewords and the second set of reference codewords for use in estimating the first channel quality metric value or the second channel quality metric value based on respective parameters reflecting variations in channel quality for each data signal received via each respective one of the at least two antenna ports.

11. A wireless communication device comprising: a transceiver configured to wirelessly receive a data signal comprising a codeword; and a signal processor comprising: a determiner configured to determine if the codeword corresponds to a reference codeword included in a first set of reference codewords or a second set of reference codewords;
a first estimator configured to estimate a first channel quality metric value for the data signal based on a first channel quality metric, if the codeword corresponds to a reference codeword included in the first set of reference codewords, wherein the first channel quality metric value is smaller than a reference channel quality metric value for the data signal, wherein the first channel quality metric is estimated by modifying the reference channel quality metric value by a first factor in order to decrease a modulation and coding scheme (MCS) value associated with codewords of the first set of reference codewords; and a second estimator configured to estimate a second channel quality metric value for the data signal based on a second channel quality metric, if the codeword corresponds to a reference codeword included in the second set of reference codewords, wherein the second channel quality metric value is equal to or larger than the reference channel quality metric value for the data signal, wherein the second channel quality metric $\tilde{\gamma}_{2,l}$ for an l-th data signal is expressed as $$\tilde{\gamma}_{2,l} = \beta \cdot \gamma(l \mid c \in C_2),$$

wherein $$\gamma(l \mid c \in C_2) = \frac{1}{\left[\left(\acute{H}^H \acute{H} + I\right)^{-1}\right]_{l,l}} - 1, l \in \{0, \ldots, L_2\},$$

wherein Ĥ is a sub-matrix of a channel estimate matrix H, H having v rows and v being the number of data signals received via each of the at least two antenna ports, wherein Ĥ is formed by rows and columns of H corresponding to a number ($L_2$) of data signals corresponding to reference codewords included only in the second set ($C_2$) of reference codewords, the notation $(\bullet)^H$ denotes a conjugate transpose operation, I is the identity matrix of the same dimension as Ĥ, and [ . . . ]$_{l,l}$ denotes the l-th diagonal element of matrix [ . . . ] and β is a further damping factor, wherein 0<β≤1.

12. The wireless communication device of claim 11, wherein the reference channel quality metric value for the data signal results from a channel quality estimation based on a predetermined channel quality metric.

13. The wireless communication device of claim 12, wherein the predetermined channel quality metric is predetermined for each data signal received via each respective one of at least two antenna ports.

14. A signal processing method comprising: determining if a codeword included in a data signal corresponds to a reference codeword included in a first set of reference codewords or a second set of reference codewords; estimating a first channel quality metric value for the data signal based on a first channel quality metric, if the codeword corresponds to a reference codeword included in the first set of reference codewords, wherein the first channel quality metric value is smaller than a reference channel quality metric value for the data signal, wherein the first channel quality metric is estimated by modifying the reference channel quality metric value by a first factor in order to decrease a modulation and coding scheme (MCS) value associated with codewords of the first set of reference codewords; and estimating a second channel quality metric value for the data signal based on a second channel quality metric, if the codeword corresponds to a reference codeword included in the second set of reference codewords, wherein the second channel quality metric value is equal to or larger than the reference channel quality metric value for the data signal, wherein the second channel quality metric $\tilde{\gamma}_{2,l}$ for an l-th data signal is expressed as $$y(l \mid c \in C_2) = \frac{1}{\left[\left(\acute{H}^H \acute{H} + I\right)^{-1}\right]_{l,l}} - 1, l \in \{0, \ldots, L_2\},$$

wherein $\acute{H}$ is a sub-matrix of a channel estimate matrix H, H having v rows and v being the number of data signals received via each of the at least two antenna ports, wherein $\acute{H}$ is formed by rows and columns of H corresponding to a number ($L_2$) of data signals corresponding to reference codewords included only in the second set ($C_2$) of reference codewords, the notation $(\bullet)^H$ denotes a conjugate transpose operation, I is the identity matrix of the same dimension as $\acute{H}$, and $[\ldots]_{l,l}$ denotes the l-th diagonal element of matrix $[\ldots]$ and β is a further damping factor, wherein 0<β≤1.

15. The signal processing method of claim 14, wherein the reference channel quality metric value for the data signal results from a channel quality estimation based on a predetermined channel quality metric.

16. The signal processing method of claim 15, wherein the predetermined channel quality metric is predetermined for each data signal received via each respective one of at least two antenna ports.

17. The signal processing method of claim 16, wherein each data signal received via each respective one of the at least two antenna ports is associated with one and only one reference codeword, each reference codeword being included in the first set of reference codewords or the second set of reference codewords.

18. The signal processing method of claim 14, wherein the determining if a received codeword corresponds to a reference codeword included in the first set of reference codewords or the second set of reference codewords comprises referring to identification information identifying the received codeword.

19. The signal processing method of claim 15, wherein the predetermined channel quality metric is a signal-to-interference-and-noise-ratio for the data signal.

20. The signal processing method of claim 14, wherein the determining if the codeword corresponds to a reference codeword included in the first set of reference codewords or the second set of reference codewords comprises referring to a pre-stored reference codeword table.

21. The signal processing method of claim 14, further comprising:
  generating the first set of reference codewords and the second set of reference codewords for use in estimating the first channel quality metric value or the second channel quality metric value;
  storing the generated first set of reference codewords and second set of reference codewords in a reference codeword table; and
  determining if the codeword corresponds to the first set of reference codewords or the second set of reference codewords by referring to the stored codeword table.

22. The signal processing method of claim 21, further comprising:
  generating the first set of reference codewords and the second set of reference codewords for use in estimating the first channel quality metric value or the second channel quality metric value based on channel quality metric values estimated in advance for each codeword included in each data signal received via each respective one of the at least two antenna ports.

23. The signal processing method of claim 21, further comprising:
  generating the first set of reference codewords and the second set of reference codewords for use in estimating the first channel quality metric value or the second channel quality metric value based on respective parameters reflecting variations in channel quality for each data signal received via each respective one of the at least two antenna ports.

* * * * *